United States Patent [19]
Isobe et al.

[11] Patent Number: 5,208,800
[45] Date of Patent: May 4, 1993

[54] MODE SPLITTER AND MAGNETO-OPTICAL SIGNAL DETECTION DEVICE

[75] Inventors: Tami Isobe, Yokohama; Shigeyoshi Misawa, Tokyo; Kiyoshi Yokomori; Syunsuke Fujita, both of Yokohama; Magane Aoki, Yokohama; Yoshinobu Nakayama, Kawasaki; Hiroyoshi Funato, Chigasaki, all of Japan

[73] Assignee: Ricoh Company, Ltd., Tokyo, Japan

[21] Appl. No.: 683,724

[22] Filed: Apr. 11, 1991

[30] Foreign Application Priority Data

| Apr. 13, 1990 | [JP] | Japan | 2-98454 |
| May 9, 1990 | [JP] | Japan | 2-119123 |
| Jul. 17, 1990 | [JP] | Japan | 2-189232 |
| Apr. 9, 1991 | [JP] | Japan | 3-76026 |

[51] Int. Cl.$^5$ .............................. G11B 7/00
[52] U.S. Cl. ........................ 369/112; 385/28; 385/14; 385/43; 385/36; 385/37
[58] Field of Search ............... 385/25, 29, 14, 43, 385/28, 36, 37, 11; 369/112, 110

[56] References Cited

U.S. PATENT DOCUMENTS

| 4,832,428 | 5/1989 | Miyawaki et al. | 385/36 |
| 4,861,128 | 8/1989 | Ishikawa et al. | 369/112 |
| 4,932,743 | 6/1990 | Isobe et al. | 385/14 |
| 4,971,414 | 11/1990 | Funato et al. | 385/14 |
| 4,978,187 | 12/1990 | Minemura et al. | 385/14 |
| 4,991,160 | 2/1991 | Premji | 369/112 |

FOREIGN PATENT DOCUMENTS 64-4706 9/1989 Japan.
64-4707 9/1989 Japan.

OTHER PUBLICATIONS

Kobayashi et al., "An Optical Waveguide TE-TM Mode Splitter" Appl. Physics Letter vol. 32 No. 5, Mar. 1, 1978, pp. 300–302.

*Primary Examiner*—Aristotelis Psitos
*Assistant Examiner*—P. W. Huber
*Attorney, Agent, or Firm*—Cooper & Dunham

[57] ABSTRACT

A magneto-optical signal detection device comprising a thin film type optical waveguide unit having a substrate on which a waveguide is formed. The unit has a coupling portion for coupling two polarization components simultaneously in a same plane of the waveguide as a TE mode and a TM mode. The modes TE and TM are included in reflection light reflected from a magneto-optical recording medium and perpendicular to each other. The unit also has a TE-TM mode separating portion having a taper boundary. A waveguide layer is gradually thinned in the taper boundary toward an outer end thereof.

11 Claims, 13 Drawing Sheets

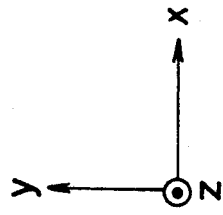
Fig. 4 PRIOR ART
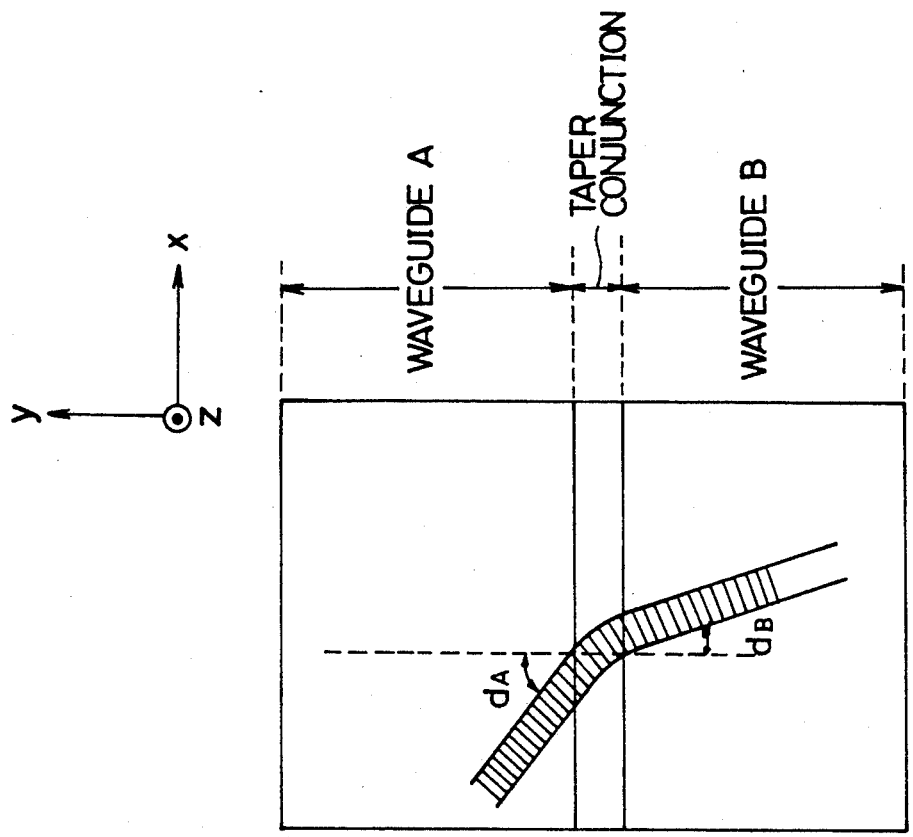
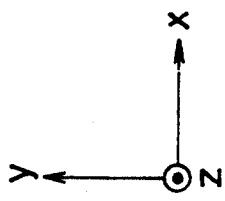
Fig. 5 PRIOR ART
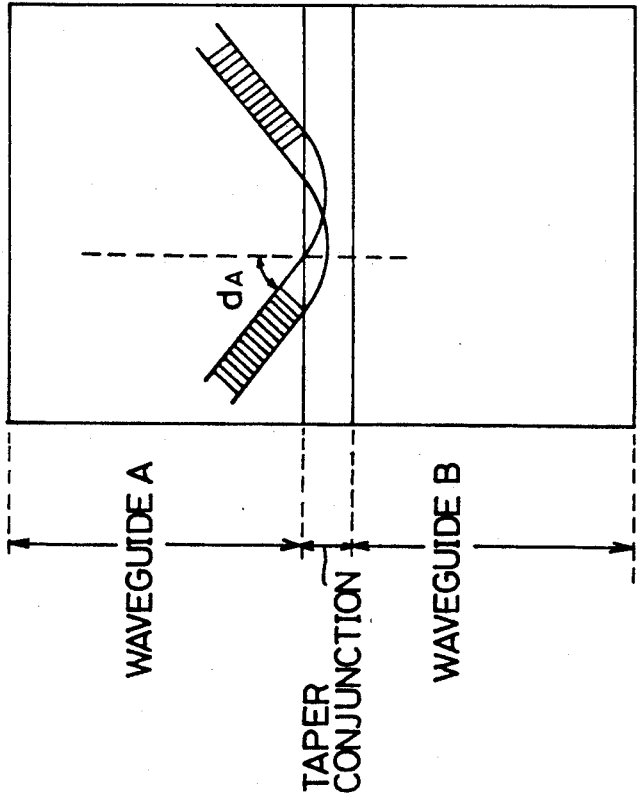

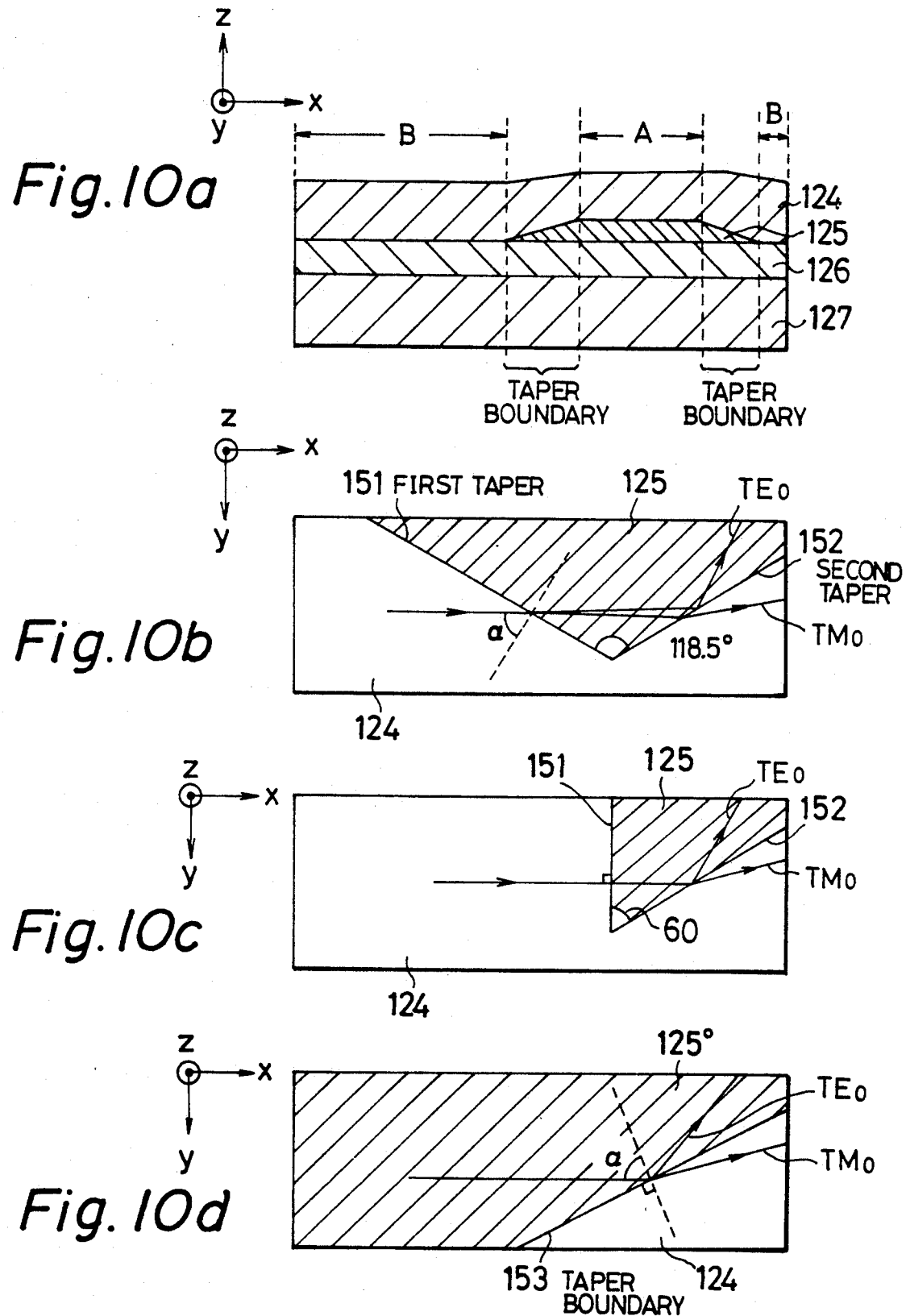

MODE SPLITTER AND MAGNETO-OPTICAL SIGNAL DETECTION DEVICE

BACKGROUND OF THE INVENTION

1. Field of the Invention

The present invention relates to an optical mode splitter for effectively separating plural waveguide modes which propagate through an optical waveguide and a magneto-optical signal detecting device using such a mode splitter.

The present invention also relates to a magneto-optical information read/write device, more particularly it relates to an optical pick up unit of the magneto-optical information read/write device such as a magneto-optical disk drive, a magneto-optical-card drive and a magneto-optical tape drive.

2. Description of the Related Art

As a mode splitter in an optical waveguide, there have been developed a groove type mode splitter, a ninety-degree Bragg type mode splitter.

However, with regard to the groove type mode splitter, a problem is that the extinction ratio is sensitive to angular deviation. Also, with regard to the ninety-degree Bragg type mode splitter, a problem is that the extinction ratio is sensitive to the wavelength fluctuation. And with regard to the directional coupler type mode splitter, a problem is that it is required to control the coupling length very severely. Therefore, it is difficult to use the above mode splitters in an optical integrated device such as an optical pick up or optical communication element.

The inventors of this application have proposed a mode splitter which enables to separate plural waveguide modes propagating in an optical waveguide efficiently by using a tapered junction in Japanese Patent Application Laying Open (KOKAI) Nos. 64-4706 and 64-4707.

The proposed mode splitter has a very simple structure and by which it is possible to separate the waveguide modes efficiently. Furthermore, in principle, the mode splitter can separate any modes at any incident angle.

However, actually, the range of the incident angle, in which the modes can be separated, is restricted by the refractive index and thickness of the waveguide. To separate the modes efficiently irrespective of fabrication errors of the refractive index and thickness of the waveguide and a misalignment of the optical elements in the waveguide, it is required to widen the above incident angle range.

On the other hand, a magneto-optical disk device has been briskly developed as a rewritable high density memory device. The magneto-optical disk system enable to read information by detecting a rotation angle of a polarization of a reflected light from the magneto-optical recording medium due to the Kerr effect.

Since the rotation angle of the polarization due to the Kerr effect is very small, it is necessary to use magneto-optical signal detection unit with a high accuracy photodetector or optical differential detecting system to obtain high S/N (signal/noise) ratio. Conventional magneto-optical signal detection unit comprises bulk type optical elements such as a polariser, a prism and a lens, which makes it difficult to arrange them at a precise position relative to each other and form a compact structure.

To solve the problems of the bulk optical system, Nishihara laboratory of Osaka University has proposed "A waveguide type differential detection device for magneto-optical disk pick up" in which a magneto-optical signal detection system is integrated on a thin film waveguide.

However, in the above waveguide type detection device, the S/N signal is poor because of an asymmetric intensity distribution of the reflected light from the magneto-optical disk at the grating coupler.

3. Summary of This Invention

The patent invention was made considering the above-mentioned points of the related art.

It is therefore an object of the present invention to provide a mode splitter having a wide range of mode separatable incident angle of light and enabling efficiently separate plural waveguide modes irrespective of the fabrication errors of the refractive index and thickness of the waveguide and the misalignment of the optical elements in the waveguide.

Another object of the present invention is to propose a magneto-optical signal detection device integrated on a thin film waveguide by which the excellent S/N signal is obtained.

FIGS. 21a and 21b explain the state where light rays propagate within an optical waveguide which comprises a substrate layer having a refractive index of $n_s$, an optical waveguide layer having a refractive index of $n_f$ and a clad layer having a refractive index of $n_c$, wherein $n_f > n_s$, $n_c$. Z in FIG. 21b represents the propagation direction of the light rays in FIG. 21a.

Assuming that a critical angle on a first boundary face between the clad layer and the optical waveguide layer is $\theta_c$ and a critical angle on a second boundary face between the substrate layer and the optical waveguide layer is $\theta_s$ in a case where light rays enter an interior of the optical waveguide layer at an angle of $\theta$ with respect to the first boundary face as shown in FIG. 21a, $\theta_c$ and $\theta_s$ are respectively given by the following formulae:

$$\theta_c = \sin^{-1}(n_c/n_f) \text{ and}$$

$$\theta_s = \sin^{-1}(n_s/n_f).$$

If the incident angle $\theta$ is greater than both of $\theta_s$ and $\theta_c$, the light rays propagate while repeating total reflections of the first and second boundary faces. Such a propagation is termed a guided mode.

The phenomenon of a guided wave represented by the total reflection of light rays can be considered in connection with wave which is another property of light.

Next, consider the case in which light rays propagate at an angle of $\theta$ with respect to the boundary within the optical waveguide layer as shown in FIG. 21a. The light rays propagating in such a state are called a plane wave from a viewpoint of wave.

If the wavelength of the plane wave in a vacuum is taken to be $\lambda$, then $k_o = 2\pi/\lambda$ is referred to as a propagation constant in the vacuum. Components of the propagation constant in X and Y directions as shown in FIG. 21b are respectively represented by the following formulae:

$$k_X = k_o n_f \cos\theta \text{ and}$$

$$k_Y = k_o n_f \sin\theta.$$

Especially, a component $\beta$ of the propagation constant in Z direction where the light rays propagate is represented by the following formula:

$$\beta = k_0 n_f \sin \theta,$$

and the constant $\beta$ is generally termed the propagation constant of guided modes.

Among these guided modes, a guided mode having a component of an electric field only in the Y direction is termed a TE mode, and a guided mode having a component of a magnetic field only in the Y direction is termed a TM mode.

The above-mentioned mode splitter can separate plural modes propagating through the waveguide having a region A and a region B, in which a mode i having propagation constants $\beta_{Ai}$ for the region A and $\beta_{Bi}$ for the region B and another mode j having propagation constants $\beta_{Aj}$ for the region A and $\beta_{Bj}$ for the region B are propagation.

The propagation constants satisfy the following formulae:

$$\beta_{Ai} > \beta_{Bi} \quad (1)$$

$$\beta_{Aj} > \beta_{Bj} \quad (2)$$

$$(\beta_{Bi}/\beta_{Ai}) > (\beta_{Bj}/\beta_{Aj}) \quad (3)$$

The mode splitter has a first taper boundary portion for conjunction from the region B to the region A and a second taper boundary portion for conjunction from the region A to the region B, each taper boundary being gradually thinned toward an outer end thereof.

An angle $\theta$ between the first and second taper boundary being larger than a critical angle for mode i, i.e., $$\theta > \sin^{-1}(\beta_{Bi}/\beta_{Aj})$$

An incident angle a of the propagating light including the mode i and j at the first taper boundary satisfying the following formula:

$$\sin^{-1}\{(\beta_{Ai}/\beta_{Bi}) \sin (\theta - \theta_{ci})\} < a < \sin^{-1}\{(\beta_{Aj}/\beta_{Bj}) \sin (\theta - \theta_{cj})\} \quad (4)$$

wherein
$\theta_{ci} = \sin^{-1}(\beta_{Bi}/\beta_{Ai})$;
which is a critical angle of the mode i; and $$\theta_{cj} = \sin^{-1}(\beta_{Bj}/\beta_{Aj});$$

which is a critical angle of the mode j.

In accordance with the mode splitter of the present invention mentioned above, plural modes are separated first due to the difference of the refraction angle at the time of refraction in the first taper portion, and after that, the modes are separated by the difference of the critical angle of each mode in the second taper portion. Therefore, it becomes possible to widen the mode separatable incident angle range and separate the modes efficiently irrespective of the fabrication errors of the refractive index and thickness of the waveguide and the misalignment of the optical elements in the waveguide compared with the related art structure wherein the modes are separated with the use of only one taper boundary portion.

The above magneto-optical signal detecting device comprises:

an optical waveguide coupling portion to couple two polarization components of reflected light from a magneto-optical recording medium, which components are perpendicular to each other, into a waveguide, and a TE-TM mode separating portion to separate a TE mode and a TM mode efficiently, which is an application of the above-mentioned mode splitter of the present invention. The TE-TM mode separating portion is also realized by the related art of mode splitter in Japanese Patent Application Laying Open (KOKAI) Nos. 64-4706 and 64-4707.

The principle of the above-mentioned optical waveguide coupling is briefly described below.

There are a grating coupler method and a prism coupler method for coupling a reflected light from a magneto-optical recording medium into an optical waveguide. In accordance with these methods, the reflected light is coupled by the phase matching of the incident wave and the waveguide mode. Therefore, any required waveguide mode can be coupled by adjusting the incident angle to the synchronous angle corresponding to the effective index of the waveguide mode.

While, each waveguide mode has a respective different effective index and it is possible to put the effective index of a TE mode close to that of a TM mode by thickening the waveguide. In the case that the effective indices of a certain TE mode (TEi mode) and a certain TM mode (TMj mode) are almost equal, both of the TEi mode and the TMj mode can be coupled by the grating coupler or the prism coupler at the same incident angle which is the synchronous angle corresponding to the effective index of the TEi mode (or TMj mode).

Therefore, it becomes possible to couple two polarization components of the reflected light from the magneto-optical recording medium, which are perpendicular to each other, into a waveguide as the TE mode and the TM mode simultaneously.

Therefore, by constituting an optical system comprising such an optical waveguide coupling portion and the TE-TM mode separation portion mentioned above in one waveguide, it becomes possible to couple two polarization components of the reflected light from the magneto-optical recording medium, which are perpendicular to each other, into a waveguide as the TE mode and the TM mode simultaneously, and after that separate the TE mode and the TM mode in the TE-TM mode separation portion.

Thereby, it becomes possible to obtain a good signal which is free from the noise caused by an asymmetric intensity distribution of the reflected light from the magneto-optical disk.

Further objects and advantages of the present invention will be apparent from the following description of the preferred embodiments of the invention as illustrated in the accompanying drawings.

BRIEF DESCRIPTION OF THE DRAWINGS

FIG. 4 is an explanatory view for explaining the principle of the mode splitter;

FIG. 5 is another explanatory view for explaining the principle of the mode splitter along with FIG. 4;

FIG. 10a is a sectional view of an embodiment of the mode splitter in accordance with the present invention;

FIG. 10b is an explanatory plan view of the mode splitter of FIG. 10a representing an example of the tapered waveguide boundary in accordance with the present invention;

FIG. 10c is an explanatory plan view of the mode splitter of FIG. 10a representing another example of the tapered waveguide boundary in accordance with the present invention;

FIG. 10d is an explanatory plan view of the mode splitter of FIG. 10a representing still another example of the tapered waveguide boundary in accordance with the present invention;

DESCRIPTION OF THE PREFERRED EMBODIMENTS

Figure 1:
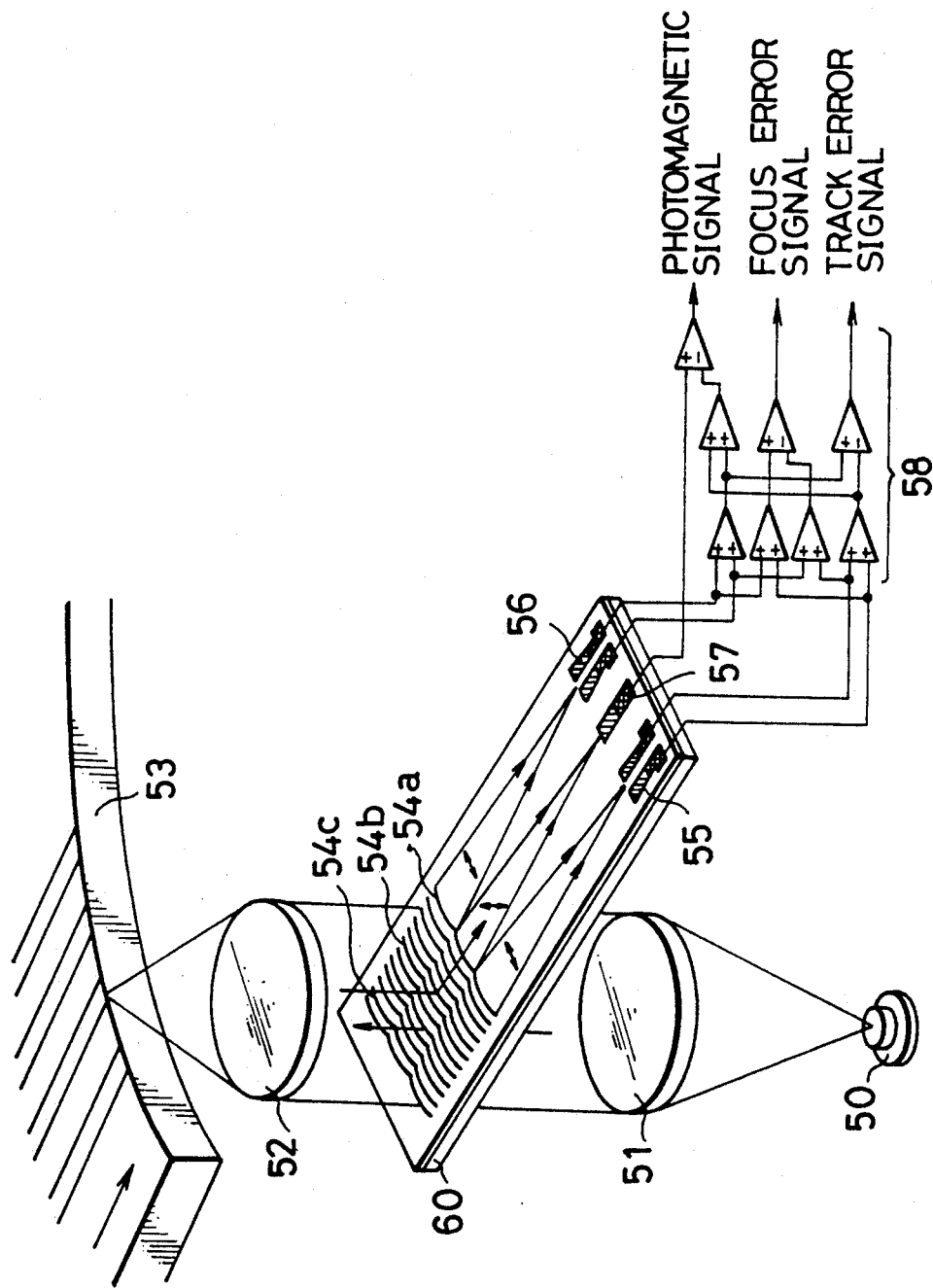
FIG. 1 is a constructional view of a magneto-optical disk pick up related to the present invention.

Embodiments of the present invention are described hereinafter with reference to the drawings in detail in comparison to the related art which is also described referring to the drawings.

FIG. 1 illustrates a magneto-optical disk pick up as a whole. A laser diode 50 emits a laser beam which is collimated by a collimator lens 51 and passes through a device element 60. After that, the beam is converged on a magneto-optical disk 53 by an objective lens 52.

Reflection rays reflected from the disk 53 are received by a focussing grating coupler (FGC) 54. The reflection rays which enter the coupler 54 through the middle portion 54b thereof are guided through the FGC 54 formed on the element 60 to an optical sensor 57. Also, the reflection rays which enter the FGC 54 through the side edge portions 54a and 54c are guided to optical sensors 56 and 55, respectively. A calculation circuit 58 detects a magneto-optical signal, a focussing signal and a tracking signal from the outputs of the sensors 55 to 57.

Figure 2:
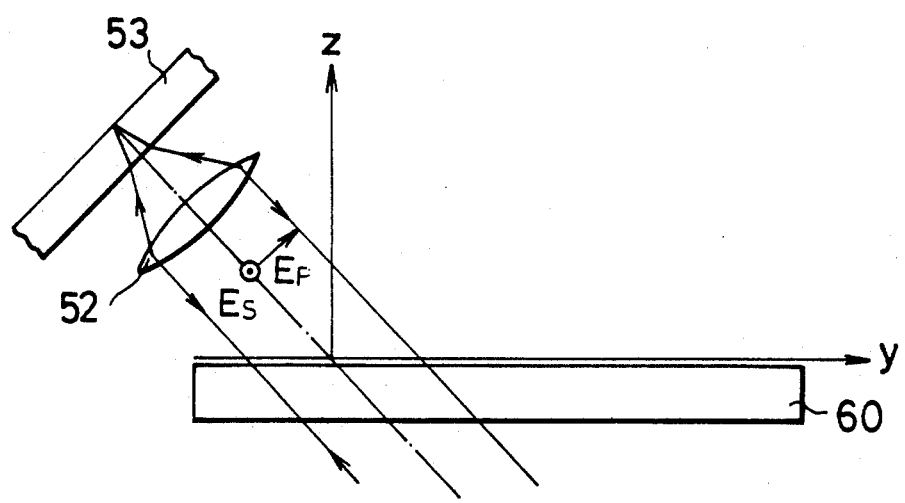
FIG. 2 is an explanatory side view of the pick up device of FIG. 1 for explaining the principle of the differential detection of the magneto-optical signal.
Figure 3:
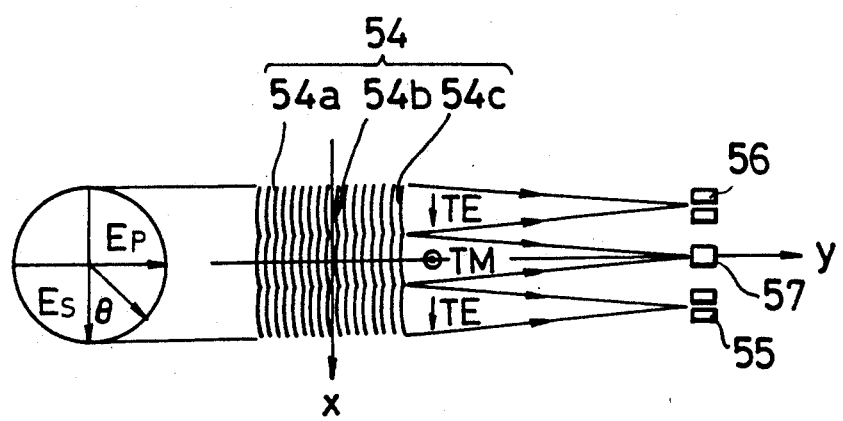
FIG. 3 is an explanatory plan view of the pick up device of FIG. 1 for explaining the principle of the differential detection of the magneto-optical signal.

The principle of differential detection of the magneto-optical signal with the use of the abovementioned structure is described hereinafter with reference to FIGS. 2 and 3.

The reflection light reflected from the disk 53 can be represented by a compound vector composed of a P component (Ep) and an S component (Es) of the electric field. Also, in the optical waveguide, a TE mode and a TM mode which are perpendicular to each other have slightly different efficient refractive indices, respectively. Taking this into consideration, an arrangement is made so that the Ep component of the reflection light satisfies a phase matching condition at the central FGC portion 54b while the Es component satisfies the condition at the side edge portions 54a and 54c so as to couple the light of TE mode. As mentioned above, the three portions of the FGC 54 function as two surface division type optical analyzers which are perpendicular to each other so that the differential detection of the magneto-optical signal can be achieved.

However, in accordance with the above mentioned differential detection arrangement of the surface division type using the FGC, there is a problem that the noise of reflection light from the disk and the uneven distribution of the luminous intensity remain without being cancelled in the differential detection process since the noise components are unevenly distributed over the coupler surface.

An embodiment of the present invention copes with the problem so that it realizes a magneto-optical signal detection device which is able to reliably obtain a magneto-optical signal without being adversely influenced by the noise of the reflection light reflected from the recording medium or the luminous intensity distribution.

The embodiment of the present invention is based on the finding that a magneto-optical signal of better S/N ratio can be obtained in such a way that the TE mode and the TM mode are coupled first in the whole coupling surface to the waveguide, and after that, the TE and TM modes are separated from each other in the waveguide. Therefore, the embodiment is arranged in such a manner that a TE mode coupling region and a TM mode coupling region are disposed in the same coupling surface and that the modes are separated by a TE-TM mode separating region having a tapered conjunction in the waveguide.

Due to the above-mentioned arrangement, the mode coupling function and the mode separation function are divided respectively so that it becomes possible to obtain a magneto-optical signal free from the adverse influences from the noise of the reflection light and the luminous intensity distribution.

First, a method for separating the TE mode and the TM mode in the waveguide is described hereinafter.

FIGS. 4 and 5 illustrate a two-dimensional optical waveguide in which a light beam is confined only with respect to the direction Z. The motion of the guided light is explained individually with regard to the motion in the Z-direction and with regard to the motion in the X-Y plane. The optical motion in the X-Y plane is explained on the basis of two-dimensional optics.

In accordance with the two-dimensional optics, the effective index of the mode corresponds to the refractive index of the bulk optical system and can be changed by changing the film thickness or the refractive index of the waveguide. Also, in accordance with the two-dimensional optics, Fermat's principle and Snell's law are valid.

The illustrated waveguide comprises a pair of two-dimensional waveguides A and B connected together through a conjunction which is tapered in the thickness direction (direction of Z-axis). When the mode propagation constants of the waveguides A and B are represented by $\beta_A$ and $\beta_B$, respectively, the Snell's law is represented by the following equation ①.

$$\beta_A \sin \alpha_A = \beta_B \sin \alpha_B \qquad ①$$

wherein $\alpha_A$ represents the incident angle in the waveguide A and $\alpha_B$ represents the refraction angle in the waveguide B. The both waveguides are disposed in the X-Y plane.

Suppose that $\beta_A > \beta_B$, if the following equation ② is satisfied, the optical wave generated in the waveguide A is refracted to the waveguide B in accordance with the equation ①. This state is represented in FIG. 2.

$$\alpha_A < \sin^{-1}(\beta_B/\beta_A) \qquad ②$$

If the incident angle $\alpha_A$ satisfies the following equation ③, $$\alpha_A > \sin^{-1}(\beta_B/\beta_A) \qquad ③$$

the optical wave is totally reflected at the conjunction portion. This state is represented in FIG. 1.

In the boundary between the two bulk media, a partial reflection phenomenon occurs in accordance with Fresnel's law. Also, in accordance with the two-dimensional optics, the partial reflection phenomenon occurs in the event that the boundary between the waveguides A and B steeply changes with respect to the wavelength of the light. However, if the boundary between the waveguides A and B is tapered or slanted very gently with respect to the wavelength of the light, one of the phenomena of refraction and total reflection occurs depending upon whether the incident angle is larger than the critical angle $\sin^{-1}(\beta_B/\beta_A)$ or not. In this case, the partial reflection never occurs.

Suppose that optical waves of mode i and mode j having propagation constants of $\beta_{Ai}$ and $\beta_{Aj}$ respectively are guided in the waveguide A. Also, suppose that following equations ④ and ⑤ are satidfied wherein the propagation constants of the mode i and the mode j in the waveguide B are represented by $\beta_{Bi}$ and $\beta_{Bj}$ respectively.

$$\beta_{Ai} > \beta_{Bi}, \beta_{Aj} > \beta_{Bj} \qquad ④$$

$$\beta_{Bi}/\beta_{Ai} > \beta_{Bj}/\beta_{Aj} \qquad ⑤$$

Further, on the assumption that the whole structure of the waveguide is constructed so that the boundary between the waveguide portions A and B is tapered very gently with respect to the wavelength of the light to be guided, the relation between the critical angle $\sin^{-1}(\beta_{Bi}/\beta_{Ai})$ for the mode i and the critical angle $\sin^{-1}(\beta_{Bj}/\beta_{Aj})$ for the mode j is represented by $$\sin^{-1}(\beta_{Bi}/\beta_{Ai}) > \sin^{-1}(\beta_{Bj}/\beta_{Aj}).$$

Therefore, if the incident angle $\alpha_A$ is set in the range as $$\sin^{-1}(\beta_{Bi}/\beta_{Ai}) > \alpha_A > \sin^{-1}(\beta_{Bj}/\beta_{Aj}) \qquad ⑥$$

then the optical wave of mode i is refracted with a refraction angle determined by the equation ① of the waveguide B while the optical wave of mode j is totally reflected at the boundary.

In accordance with the above-mentioned principle, when the mode i and the mode j are supposed to be a TE mode and a TM mode, respectively, or vice versa, the TE mode and the TM mode can be separated from each other on the conditions that the equations ④ and ⑤ are satisfied, that the boundary between the waveguides A and B is formed as a fully gentle taper structure with respect to the wavelength of the light and that the incident angle $\alpha_A$ of the light incident to the boundary satisfies the formula ⑥.

Next, a method for coupling the TE mode light and the TM mode light on the whole coupling surface to the waveguide is described hereinafter.

The reflection light reflected from the magneto-optical recording medium is guided into the optical waveguide by a known method such as a grating coupler method or a prism coupler method. In accordance with these methods, the optical wave is coupled by matching the phase of the incident wave to that of the waveguide mode. Any desired waveguide mode can be coupled by adjusting the incident angle $\theta$.

Also, each waveguide mode in the waveguide has a respective different effective index. However, it is possible to equalize the refractive index of a TE mode and that of a TM mode by firmly confining the waveguide mode in the waveguide by thickening the waveguide. In the state wherein the effective indices of a certain TE mode ($TE_i$ mode) and a certain TM mode ($TM_j$ mode) are almost equal together, when an optical wave is to be coupled by the grating coupler method or the prism coupler method, both of the $TE_i$ mode and the $TM_j$ mode can be coupled into the waveguide by introducing the light to the waveguide with an incident angle corresponding to the effective index of the $TE_i$ mode or $TM_j$ mode.

Therefore, it becomes possible to arrange an optical waveguide coupling which couples simultaneously the TE mode and the TM mode, respectively. Therefore, by constituting an optical system comprising such an optical waveguide coupling unit in conjunction with the TE-TM mode separation unit having the tapered conjunction portion, it becomes possible to simultaneously couples into the waveguide the polarization component corresponding to the TE mode of the reflection light reflected from the magneto-optical recording medium and that corresponding to the TM mode, and after that separate the TE mode and the TM mode in the TE-TM mode separation unit. Thereby, it becomes possible to obtaim a magneto-optical signal.

In accordance with the separation method mentioned above, it becomes possible to obtain a magneto-optical signal free from the adverse influences from the noise of reflection light reflected from the recording medium and the luminous intensity distribution, coping with the aforementioned points concerning the related art of the Osaka University wherein the TE mode and the TM mode are separated in the different areas, respectively.

An embodiment of the magneto-optical signal detection device in accordance with the present invention is described hereinafter.

Figure 6:
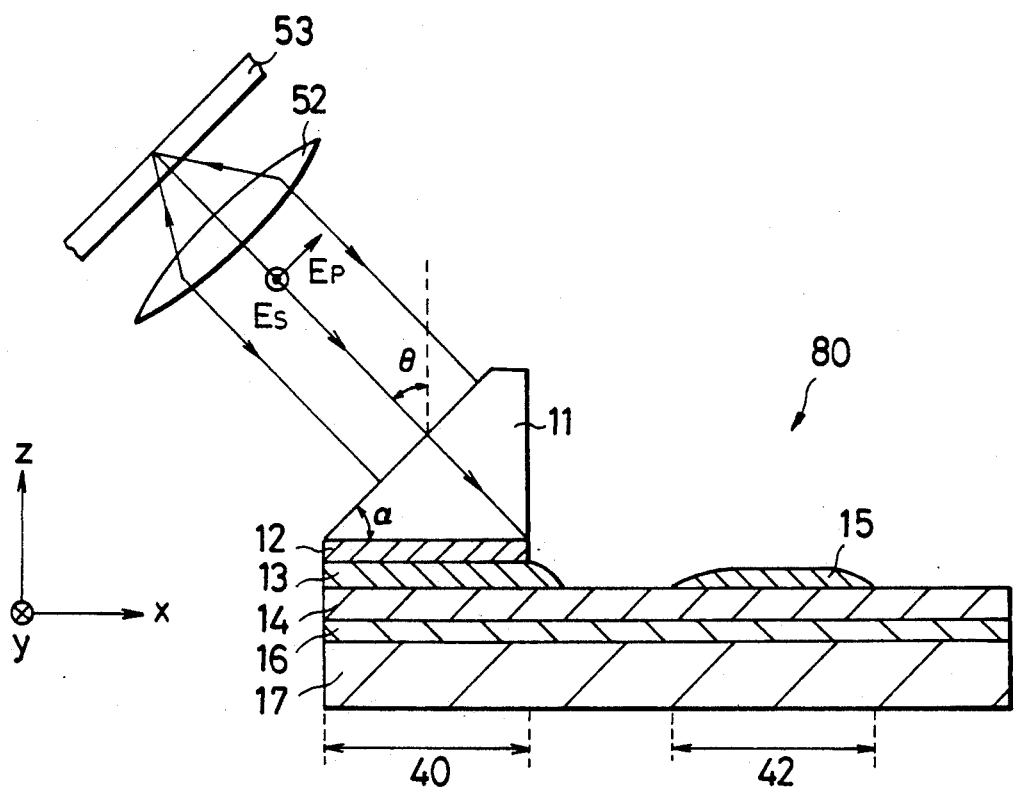
FIG. 6 is a sectional view of an embodiment of the present invention.
Figure 7:
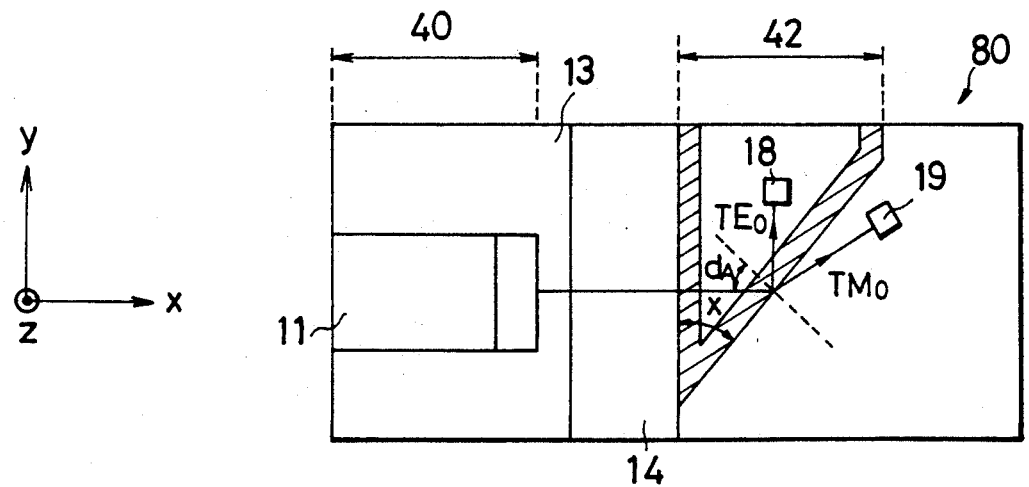
FIG. 7 is a plan view of the embodiment of FIG. 6.

FIG. 6 illustrates a sectional view of an embodiment of the present invention. Also, FIG. 7 illustrates a plan view of the embodiment of FIG. 6.

In the drawing of FIG. 6 is depicted a magneto-optical signal detection device 80 comprising a substrate 17 of Si which device is produced in such a way that a buffer layer 16 of $SiON_z$ is formed first on the substrate 17 by a thermal oxidation process thereof and waveguide layer 14 is formed then on the layer 16 by a plasma CVD method.

After that, a clad layer 13 of SiON having a lower refractive index than the layer 14 is formed on a coupling region 40 of the layer 14 by a plasma CVD method in order to enhance the coupling efficiency of the guided light. Also, on a region other than the coupling region 40, a waveguide layer 15 of SiN having a higher refractive index than the layer 14 is formed by a plasma CVD method.

The layers 13 and 15 are disposed on the layer 14 in a form as illustrated in FIG. 6. Each of the layers 13 and 15 may be formed either by forming a film on the layer 14 by an evaporation process and etching the film remaining the layer 13, 15 or using an evaporation process with the use of a mask corresponding to the form of the layer 13, 15.

It is to be stressed that the peripheral boundary portion of the layer 15 (shadowed in FIG. 7) deposited on the layer 14 is formed as a fully gentle taper with respect to the wavelength of the light.

Also, on the region 40 of the clad layer 13, a coupling prism 11 is secured through an adhesive agent 12 which has a higher refractive index than the layer 14. Also, the refractive index of the prism 11 is higher than that of the layer 14.

The refractive index and thickness of each of the layers mentioned above with respect to the light of wavelength 7800 Å are represented as follows.

|  | Ref. Index | Thick ($\mu$m) |
| --- | --- | --- |
| SiON clad layer 13 | 1.460 | 0.600 |
| SiON waveguide lyr 14 | 1.550 | 1.500 |
| SiN waveguide lyr 15 | 1.870 | 0.300 |
| SiO$_2$ buffer lyr 16 | 1.460 | 1.000 |

Also, the refractive index of the prism 11 is 2.010 and that of the adhesive agent 12 is 1.800.

The apex angle $\alpha$ of the prism is 54.7°. The effective indices of the portion 40 having the prism 11 secured thereto are 1.5375 and 1.5369 for the TE$_o$ mode and TM$_o$ mode, respectively, that is almost equal to each other. Therefore, when the incident angle $\theta$ of the light incident to the prism 11 is 45 degrees, both of the TE$_o$ mode and the TM$_o$ mode are coupled into the waveguide with the coupling efficiency of 80%.

The TE$_o$ mode and the TM$_o$ mode light components coupled into the waveguide are propagated to the TE-TM mode separation portion 42 having the high refractive index layer 15 formed thereon. It is to be noted that the peripheral boundary of the layer 15 shadowed in FIG. 7 is tapered fully gently with respect to the wavelength of the light being used, the light propagating through the layer 14 is gradually propagated to the layer 15 so that the propagation loss of light due to scattering is attenuated.

The light passing through the layer 15 comes to the inclined boundary between the layers 14 and 15 with an incident angle $\alpha_A$, as illustrated in FIG. 7. In this case, the effective indices of the TE$_o$ mode and the TM$_o$ mode in the layer 15 are 1.7096 and 1.6492, respectively. Also, those in the layer 14 are 1.5356 and 1.5342, respectively.

Also, due to the arrangement that the boundary portion between the layers 14 and 15 shadowed in FIG. 7 is formed as a fully gentle taper with respect to the wavelength of the propagating light, on the condition that the incident angle $\alpha_A$ satisfies the formula ⑥ of the mode splitter principle mentioned before, that is, $$\sin^{-1}(1.5356/1.7096) < \alpha_A < \sin^{-1}(1.5342/1.6492),$$

that is, if the $\alpha_A$ is set between 63.9° and 68.5°, the TE$_o$ mode light is totally reflected at the boundary between the layers 14 and 15 while all of the TM$_o$ mode light passes through the boundary. Thereby, the TE$_o$ mode and the TM$_o$ mode can be separated at the boundary.

When the positional relation between the magneto-optical recording medium 53 and the device 80 is arrenged as illustrated in FIG. 6, the P component of the reflection light reflected from the medium 53 coupled the TM mode while the S component of the reflection light couples the TE mode.

As mentioned above, the incident angle $\theta$ of the light incident to the prism 11 is set as 45°, so that the TE$_o$ mode and the TM$_o$ mode are simultaneously coupled at the coupling portion 40. After that, the TE$_o$ mode and the TM$_o$ mode are separated from each other at the separating portion 42. The separated TE$_o$ mode and the TM$_o$ mode are detected by photodetectors 18 and 19, respectively. From the difference between the outputs of the detectors 18 and 19, it becomes possible to obtain a magneto-optical signal in which in-phase noises are attenuated.

Figure 8:
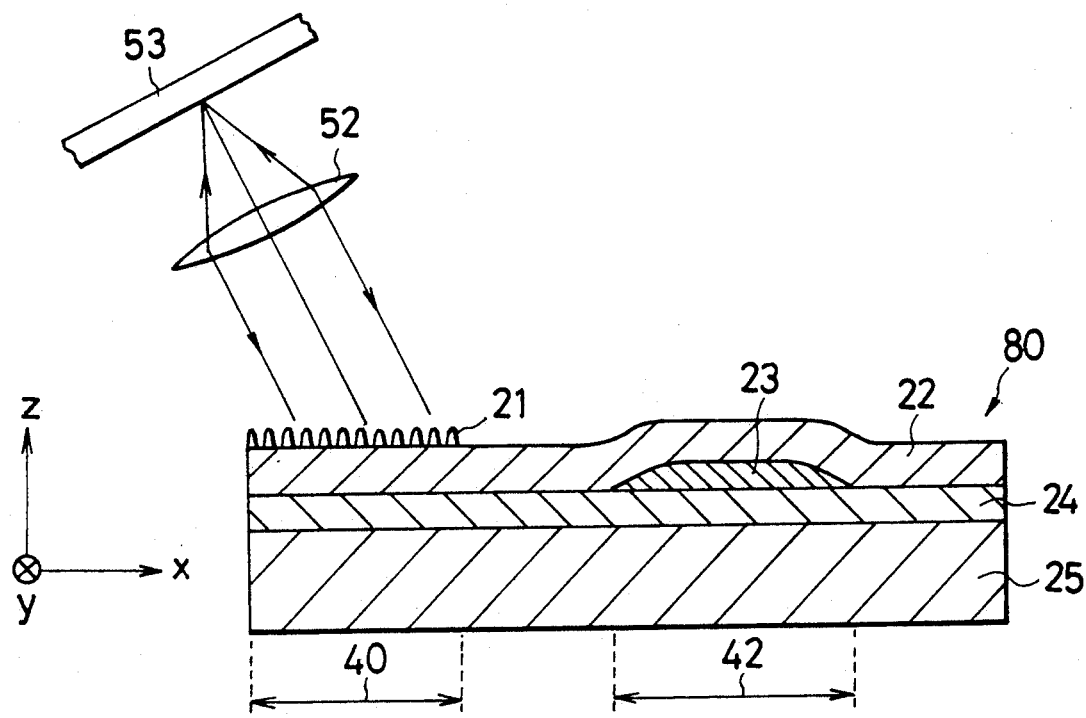
FIG. 8 is a sectional view of another embodiment of the present invention.

FIG. 8 illustrates another embodiment of the present invention.

Figure 9:
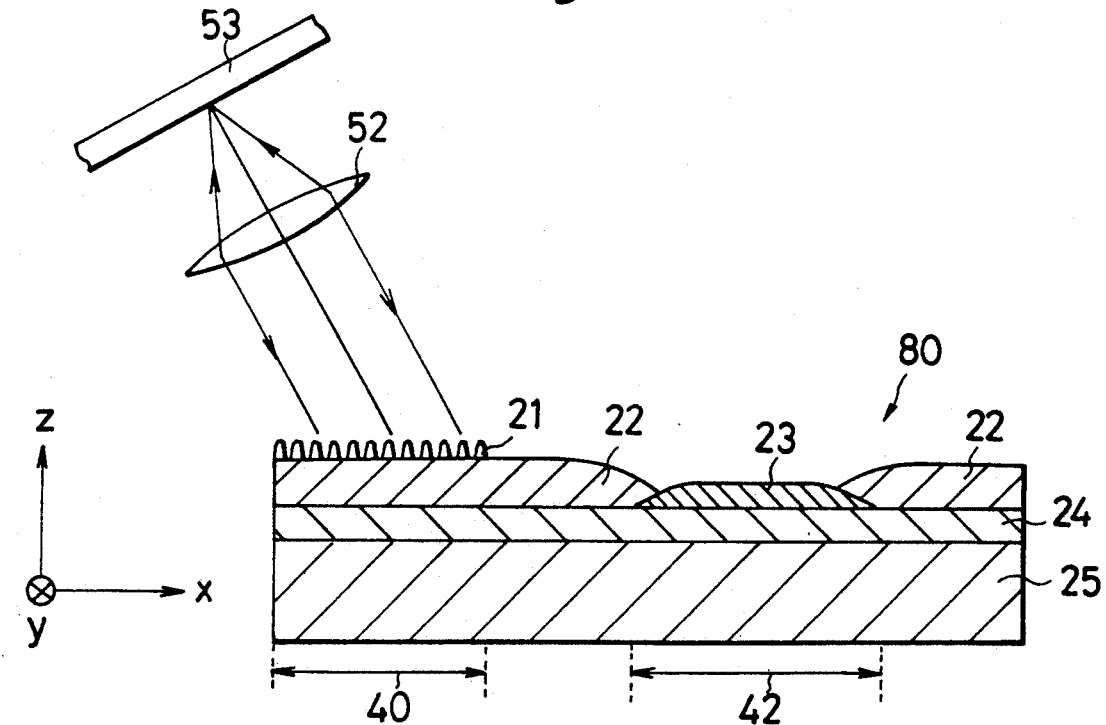
FIG. 9 is a sectional view of still another embodiment of the present invention.

Also, FIG. 9 illustrates still another embodiment of the present invention.

Each of these embodiments comprises a grating coupler 21 disposed at the coupling portion 40. More precisely, a resist layer is coated on the waveguide layer 22 of SiON so that the layer 22 is patterned to form a linear grating pattern having a pitch corresponding to the effective index of the TE$_o$ mode (or TM$_o$ mode), which enables to simultaneously couple the TE$_o$ mode and the TM$_o$ mode having almost the same effective indices.

Also, in each of the embodiments of FIGS. 8 and 9 wherein the relative positional relation between the recording medium 53 and the waveguide is the same, an arrangement is made so that the P component of the reflection light reflected from the medium 53 couples the TM mode in the waveguide while the S component of the reflection light couples the TE mode in the waveguide. It may be arranged so that the P component couples the TE mode while the S component couples the TM mode, instead of the above mentioned arrangement.

In the embodiment of FIG. 8, the device 80 comprises a waveguide layer 22 of SiON and a waveguide 23 of SiN as in the embodiment of FIG. 6. The embodiment of FIG. 8 differs from that of FIG. 6 in that the layer 23 is deposited on the layer 24 by an evaporation process first in the TE-TM mode separating portion 42 and etched to form a predetermined pattern, for example, as the layer 15 illustrated in FIGS. 6 and 7 and after that, the layer 22 is coated all over the layers 23 and 24. It is to be noted that the periphery boundary of the layer 23 is formed as a fully gentle taper as the shadowed boundary of the layer 15 of FIG. 7 mentioned before.

In accordance with the waveguide structure of FIG. 8 mentioned above, the mode propagation, that is the propagation of the light in the waveguide, from the layer 22 to the layer 23 or vice versa is achieved more smoothly than in the case of the embodiment of FIG. 6 so that scattering of the light at the boundary portion can be minimized. Numeral 25 in FIG. 8 designates the substrate.

In the embodiment of FIG. 9, the TE-TM mode separating portion 42 is arranged in such a way that the waveguide layer 23 of SiN is formed on the buffer layer 24 by an evaporation process and etched to be patterned to form the same shape as the layer 15 of the embodiment of FIG. 6 and after that, the waveguide layer 22 is deposited on the layers 23 and 24 by an evaporation process disposing a mask to cover the layer 23 so that the layer 22 is not formed on the layer 23.

In accordance with the arrangement of FIG. 9, the difference between the effective indices of the $TE_o$ mode and the $TM_o$ mode in the layer 23 becomes larger than that of the arrangement of FIG. 8. This enables to widen the range of incident angle $a_A$ at the separating portion 42 which is represented by the formula (6) mentioned before. Thereby, it becomes possible to increase the design freedom.

As mentioned above, in accordance with the embodiments of the present invention, the signal detection device is monolithicly formed from one waveguide having almost the same effective indices for the TE mode and the TM mode, an optical waveguide coupling portion wherein the two modes are simultaneously coupled without dividing the coupling surface, and a TE-TM mode separating portion having a tapered boundary conjunction wherein the thickness is slanted formed on the waveguide. The two polarization components perpendicular to each other included in the reflection light reflected from the recording medium are simultaneously coupled in the waveguide as the TE mode or the TM mode. And the two modes are separated afterward and detected by a differential detection process so that a magneto-optical signal can be reliably obtained without being adversely influenced from the noise of the scattered reflection light reflected from the recording medium and the luminous intensity of the reflection light.

Also, when an optical pick up is to be formed according to the present invention, only the bulk optical element required is the objective lens, which makes it possible to easily adjust the relative position of the lens with the waveguide coupling portion and realize a compact device.

Another embodiment of the present invention is described hereinafter.

FIG. 10a illustrates an example of a mode splitter in section to which the present invention is applied.

FIGS. 10b to 10d are plan views of the mode splitter of FIG. 10a representing different patterns, respectively.

The mode splitter has a layered structure, as illustrated in FIG. 10a, comprising a substrate 127 of Si, a buffer layer 126 of $SiO_2$ formed on the substrate 127 and a waveguide layer 125 of SiN formed on the layer 126. A waveguide layer 124 of SiON is further formed on the layer 125. The boundary portion between the layers 124 and 125 is formed as a fully gentle taper, as illustrated in FIG. 10a.

Since the guided light propagates through the layer having the highest refractive index, the light is propagated through the SiN layer 125 when passing through the region A while the light is propagated through the SiON layer 124 when passing through the region B. The refractive index and the thickness of each layer are represented in the table 1 below.

Three examples of the pattern of the SiN layer 125 are illustrated in FIGS. 10b to 10d, respectively. In the examples of FIGS. 10b and 10c, the light is propagated as B→A→B or A. On the other hand, in the example of FIG. 10d, the light is propagated as A→B or A.

In the pattern examples of FIGS. 10b and 10c, the light passes through a first taper 151 to propagate from the region B to the region A and then comes to a second taper 152 to propagate from the region A to the region B (or to be reflected to the region A).

The refractive index and the thickness of each of the layers 124, 125, 126 and the substrate 127 are represented in the following table-1.

TABLE 1

| | Refrtv. Index | Thick (μm) |
|---|---|---|
| SiON Waveguide lyr 124 | 1.529 | 1.477 |
| SiN Waveguide lyr 125 | 1.875 | 0.322 |
| SiO$_2$ Buffer lyr 126 | 1.460 | 1.000 |
| Si Substrate 127 | 3.858–0.018i | — |

The effective indices of the $TE_o$ mode and the $TM_o$ mode in the regions A and B are represented in the following table-2.

TABLE 2

| | Region A | Region B |
|---|---|---|
| $TE_o$ Mode | 1.5188 | 1.7690 |
| $TM_o$ Mode | 1.5179 | 1.7407 |

Therefore, the critical angle $\theta_{CTEO}$ of the $TE_o$ mode and the critical angle $\theta_{CTMO}$ of the $TM_o$ mode at the second taper 152 in FIGS. 10b and 10c or at the taper boundary 153 in FIG. 10d are represented by the following equations.

$$\theta_{CTEO} = \sin^{-1}(1.5188/1.7690) \approx 59.2°$$

$$\theta_{CTMO} = \sin^{-1}(1.5179/1.7407) \approx 60.7°$$

With regard to the pattern example of FIG. 10d, when the light including the $TE_o$ mode and the $TM_o$ mode is propagated through the region A to the boundary 153 with an incident angle $a$, if the condition $$59.2° \leq a \leq 60.7°$$

is satisfied, the $TE_o$ mode is totally reflected at the boundary 153 while the $TM_o$ mode is refracted and passes through the boundary 153. Thereby, the two modes are separated from each other.

On the other hand, with regard to the pattern example of FIG. 10c, when the light including the $TE_o$ mode and the $TM_o$ mode is propagated through the region B to the first taper 151 with an incident angle $\alpha$, if the condition $$-0.93° \leq \alpha \leq 0.80°$$

is satisfied, the $TE_o$ mode is totally reflected at the second taper 152 while the $TM_o$ mode is refracted and passes through the second taper 152. Thereby, the two modes are separated from each other.

Also, with regard to the pattern example of FIG. 10b, when the light including the $TE_o$ mode and the $TM_o$ mode is propagated through the region B to the first taper 151 with an incident angle $\alpha$, if the condition $$58.2° \leq \alpha \leq 62.0°$$

is satisfied, the $TE_o$ mode is totally reflected at the second taper 152 while the $TM_o$ mode is refracted and passes through the second taper 152. Thereby, the two modes are separated from each other.

As can be seen from the description mentioned above, in the case where only one taper boundary 153 is arranged to separate the $TE_o$ mode (total reflection) and the $TM_o$ mode (refraction), as the example of FIG. 10d, it becomes necessary to set the incident angle $\alpha$ to be between the critical angle $\theta_{CTEO}$ of the $TE_o$ mode and the critical angle $\theta_{CTMO}$ of the $TM_o$ mode.

On the other hand, in the case of the pattern example of FIG. 10b or 10c, the $TE_o$ mode and the $TM_o$ mode are separated first due to the refraction angle difference between the two modes when being refracted at the first taper boundary 151 and after that, the $TE_o$ mode is totally reflected while the $TM_o$ mode is refracted at the second taper boundary 152 due to the critical angle difference between the two modes so as to completely separate the two modes from each other at the second boundary. In this case, the allowable range of angle $\alpha$ to totally reflect the mode $TE_o$ and refract the mode $TM_o$ becomes larger than the difference between the critical angles $\theta_{CTEO}$ and $\theta_{CTMO}$ at the second taper boundary 152.

With regard to the pattern of FIG. 10c, the difference is represented as $$|0.80-(-0.93)|=1.73°.$$

Also, with regard to the pattern of FIG. 10b, the difference is represented as $$|62.0-58.2|=3.8°.$$

Each of the patterns of FIGS. 10b and 10c has a larger critical angle difference than that of the pattern of FIG. 10d which is represented as $$|60.7-59.2|=1.5°.$$

It is to be noted that the allowable range of the angle $\alpha$ becomes large according as the angle between the first taper boundary 151 and the second taper boundary 152 becomes large. Therefore, in the particular embodiments of FIGS. 10b and 10c, the allowable angle of the FIG. 10b pattern is larger than that of the FIG. 10c pattern.

On the other hand, in the case where the angle between the first and second taper boundarys is smaller than the critical angle $\theta_{CTEO}$, the allowable range of the angle $\alpha$ becomes smaller than the difference between the critical angles $\theta_{CTEO}$ and $\theta_{CTMO}$.

Also, in the case of the pattern of FIG. 10b, when the incident angle $\alpha$ to the first taper boundary is set to be 60°, the incident angle to the second taper boundary becomes 60.5° for the $TE_o$ mode and 59.5° for the $TM_o$ mode, respectively, that differ from the respective critical angles $\theta_{CTEO}$ and $\theta_{CTMO}$ by 1.3° and 1.2°, respectively.

However, in the case of the pattern of FIG. 10d wherein only one taper boundary is arranged, when the incident angle $\alpha$ with respect to the boundary is set to be 60°, the $TE_o$ mode and the $TM_o$ mode differ from the critical angles $\theta_{CTEO}$ and $\theta_{CTMO}$ only by 0.8° and 0.7°, respectively.

It is to be noted that when the incident angle with respect to the taper boundary for separating the modes (the second taper in the case of FIG. 10b) is close to the critical angle of the mode, it becomes easy to induce the aforementioned partial reflection (partial penetration). Therefore, it is desirable that the incident angle be far from the critical angle to obtain a signal of high S/N ratio.

As mentioned above, in accordance with the embodiment of the present invention, the mode splitter is arranged in such a manner that a waveguide B having propagation constants $\beta_{Bi}$ and $\beta_{Bj}$ for the mode i and the mode j, respectively, and a waveguide A having propagation constants $\beta_{Ai}$ and $\beta_{Aj}$, respectively, are connected through a tapered boundary conjunction which is very gradually slanted to form a taper with respect to the wavelength of the light propagated therethrough, that the above-mentioned propagation constants satisfy the following formulae (1), (2) and (3) ((4) and (5) mentioned before)

$$\beta_{Ai} > \beta_{Bi} \quad (1)$$

$$\beta_{Aj} > \beta_{Bj} \quad (2)$$

$$(\beta_{Bi}/\beta_{Ai}) > (\beta_{Bj}/\beta_{Aj}) \quad (3),$$

that a first taper boundary from the waveguide B to the waveguide A and a second taper boundary from the waveguide A to the waveguide B are arranged between the waveguides and that the angle between the first and second taper boundaries is larger than the critical angle $\sin^{-1}(\beta_{Bi}/\beta_{Ai})$ of the mode i.

Also, the incident angle $\alpha$ satisfies the following formula (4)

$$\sin^{-1}\{(\beta_{Ai}/\beta_{Bi})\sin(\theta-\theta_{Ci})\} < \alpha < \sin^{-1}\{(\beta_{Aj}/\beta_{Bj})\sin(\theta-\theta_{Cj})\} \quad (4)$$

wherein $\theta_{Ci} = \sin^{-1}(\beta_{Bi}/\beta_{Ai})$ represents the critical angle of the mode i and $\theta_{Cj} = \sin^{-1}(\beta_{Bj}/\beta_{Aj})$ represents the critical angle of the mode j.

In accordance with the above-mentioned arrangement, the mode i is refracted to the waveguide B while the mode j is totally reflected at the second taper boundary.

In that case, the allowable range of the incident angle $\alpha$ (range of the formula (4)) becomes larger than in the case where there is only the second taper boundary arranged (range of aforementioned formula (6)). And besides, the absolute value of the difference between the incident angle $\alpha_{Zi}$ and the critical angle $\theta_{Ci}$ and the absolute value of the difference between the incident angle $\alpha_{Zj}$ and the critical angle $\theta_{Cj}$ become larger than those in the case where there is only the second taper boundary arranged.

As mentioned above, in accordance with the mode splitter of the present invention, a plurality of modes are separated first due to the refraction angle difference between the modes at the time of refraction at the first taper boundary and after that, the modes are separated due to the critical angle difference between the modes at the second taper boundary. Therefore, the allowable range of the incident angle becomes large when compared with the case where the modes are separated with the use of only one taper boundary. This makes it possible to reduce the fabrication errors of the waveguide and misalignment of the waveguide with the other elements.

It is to be noted that by arranging the modes i and j as the mode TE and TM, or vice versa, respectively, it becomes possible to separate the TE mode and the TM mode from each other.

Figure 11A:
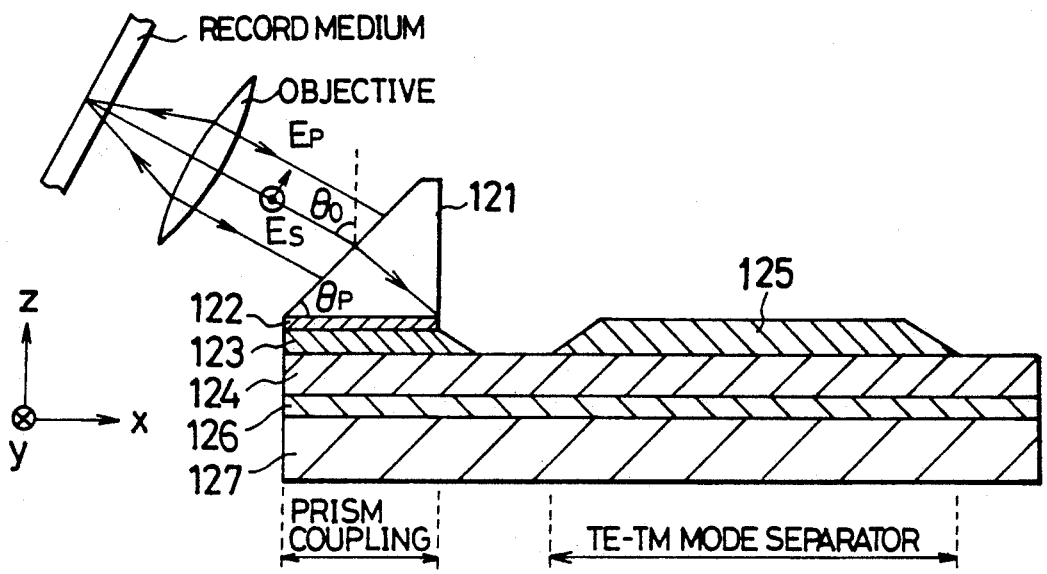
FIG. 11a is a sectional view of a magneto-optical signal detection device in accordance with an embodiment of the present invention.

FIG. 11a illustrates an embodiment of the magneto-optical signal detection device in accordance with the present invention. The device comprises the mode splitter of FIG. 10 mentioned above to detect the signal.

The invention has proposed in the prior described embodiments concerning FIGS. 6 to 9 a magneto-optical signal detection device in which two polarization components perpendicular to each other of the reflection light reflected from the recording medium are guided to the optical system comprising a waveguide coupling portion in which the components are coupled as a TE mode and a TM mode and a TE-TM mode separating portion including taper conjunction having linearly changing thickness to form a taper.

FIG. 11a is a sectional view of the magneto-optical signal detection device according to the present invention.

Figure 11B:
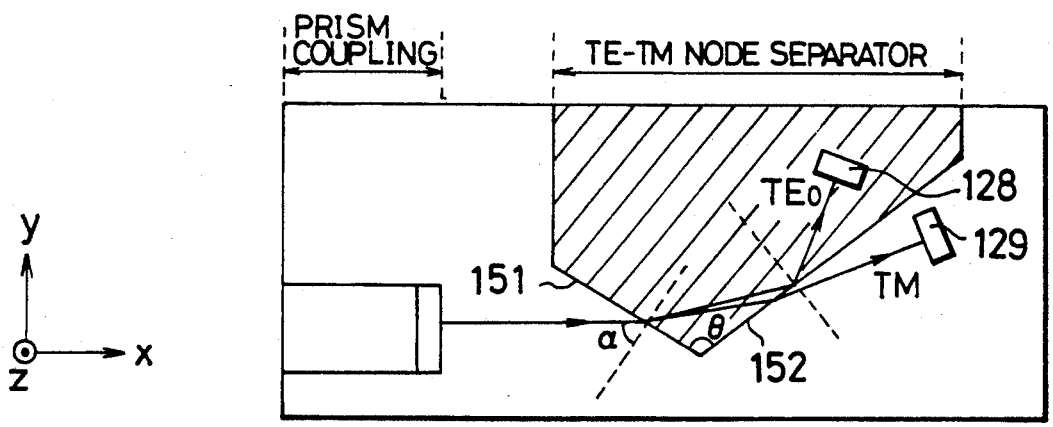
FIG. 11b is a plan view of the device of FIG. 11a wherein a mode splitter of the present invention is applied to the TE-TM mode separation unit thereof.

FIG. 11b illustrates a plan view of the device in the X-Y plane in accordance with the present invention in which the mode splitter of the invention is applied to the TE-TM mode separating portion of the device.

Figure 11C:
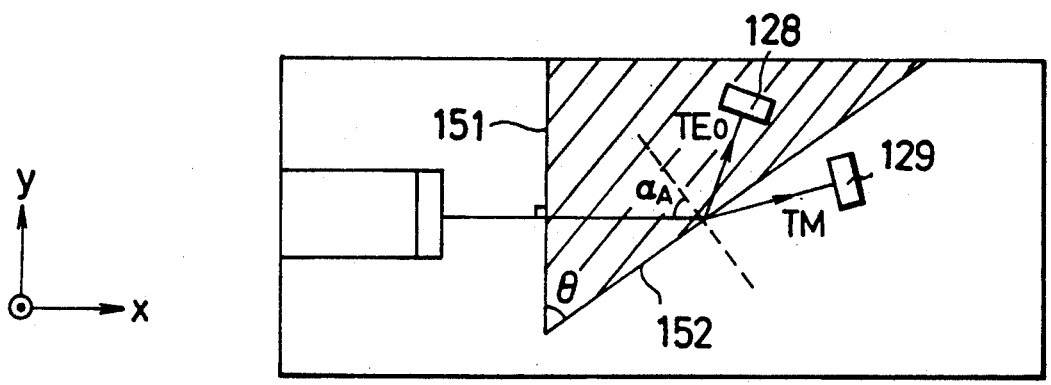
FIG. 11c is a plan view of a magneto-optical signal detection device in accordance with the art of the prior application.

FIG. 11c illustrates a plan view of the magneto-optical detection device according to the prior described embodiments. The sectional view of the device of the prior embodiments is essentially the same as that illustrated in FIG. 11a.

The device concerning prior embodiments is described again with reference to FIGS. 11a and 11c.

The signal detection device comprises a substrate 127 of Si, a buffer layer 126 of SiO$_2$ formed on the substrate 127 by a thermal oxdation process and a waveguide layer 124 of SiON formed on the layer 126 by a plasma CVD method. The coupling portion is constituted from a gap layer 123 of SiON having a lower refractive index than the layer 124, an adhesive layer 122 having a higher refractive index than the layer 124, and a prism 121 having a high refractive index. The TE-TM mode separating portion is constituted from a waveguide layer 125 of SiN having a higher refractive index than the layer 124 formed on the layer 124.

The refractive index and the thickness of each layer of the device are represented in the following table-3.

TABLE 3

| (Wavelength: 780 nm) | | |
|---|---|---|
| | Rfrtv. Indx | Thick (μm) |
| SiO$_2$ Buffer lyr 126 | 1.460 | 1.00 |
| SiON Waveguide lyr 124 | 1.550 | 1.50 |
| SiN Waveguide lyr 125 | 1.870 | 0.30 |
| SiON Gap lyr 123 | 1.460 | 0.60 |
| Adhesive lyr 122 | 1.800 | — |
| prism 121 | 2.010 | — |

The apex angle $\theta_P$ of the prism 121 is 54.7°. The effective indices of the coupling portion for the mode TE$_o$ and the mode TM$_o$ are almost the same together, that is, 1.5375 and 1.5369, respectively. Therefore, when the incident angle $\theta_P$ is 45°, the mode TE$_o$ and mode TM$_o$ are introduced into the waveguide 124 and coupled therein with the coupling efficiency of 80%.

The modes of TE$_o$ and TM$_o$ coupled into the waveguide are propagated to the TE-TM mode separating portion where the modes (light) are transferred from the waveguide layer 124 to the waveguide layer 125 which has a higher refractive index than the layer 124. In this transferring of the modes from the layer 124 to the layer 125, since the boundary of the layer 125 is formed as a taper fully gentle with respect to the wavelength of the light, the scattering loss of light can be almost avoided.

The light guided through the layer 125 comes to the inclined boundary between the layers 125 and 124 with an incident angle $\alpha_A$. Note that the effective indices for the modes TE$_o$ and TM$_o$ in the layer 125 are 1.7096 and 1.6492, respectively, and those in the layer 124 are 1.5356 and 1.5342, respectively.

Also, the boundary portion between the layers 124 and 124 is formed as a taper having a fully gentle inclination with respect to the wavelength of the light.

Therefore, if the condition of the incident angle $\alpha_A$ $$\sin^{-1}(1.5356/1.7096) < \alpha_A < \sin^{-1}(1.5342/1.6492)$$

is satisfied, that is, if the incident angle $\alpha_A$ is between 63.9° and 68.5°, the TE$_o$ mode light is totally reflected while the TM$_o$ mode light penetrates through the boundary with zero reflection. Thereby, the modes TE$_o$ and TM$_o$ can be separated from each other.

The separated modes TE$_o$ and TM$_o$ are received by respective photodetectors 128 and 129. And by comparing the outputs from the detectors and calculating the difference therebetween, it becomes possible to obtain a magneto-optical signal excluding in-phase noise.

In accordance with the prior embodiments, the incident light is perpendiclarly guided to the first taper boundary 151, as illustrated in FIG. 11c. Therefore, when the angle $\theta$ between the first and second tapers 151 and 152 is 66.2°, the allowable range of the incident angle $\alpha$ with respect to the first taper is represented as $$-2.5° \leq \alpha \leq 2.6°$$

so that the allowable amount becomes $$|2.6° - (-2.5°)| = 5.1°.$$

Also, when the light is perpendicular to the first taper 151 ($\alpha = 0$), the incident angle $\alpha_A$ with respect to the second taper 152 is 66.2° for each of the TE$_o$ mode and the TM$_o$ mode, that is, the angle differs by 2.3° and 2.3° from the critical angles $\theta_{CTEO}$ (=63.9°) and $\theta_{CTMO}$ (=68.5°), respectively.

On the other hand, in accordance with the structure of FIG. 11b wherein the present invention is applied to the TE-TM mode splitting portion, the angle $\theta$ between the first and second tapers 151 and 152 is 118.6°, which results in that the allowable range of the incident angle $\alpha$ with respect to the first taper boundary 151 is represented by $$55.6° \leq \alpha \leq 65.3°$$

and that the allowable amount becomes $$|65.3° - 55.6°| = 9.7°$$

which is larger than the amount in the case of FIG. 11c, mentioned above.

Also, when the incident angle $\alpha$ is 60° with respect to the first taper boundary 151, the incident angle $\alpha_A$ with respect to the second taper boundary 152 is 67.5° for the $TE_o$ mode and 64.9° for the $TM_o$ mode, respectively, that is, the incident angle $\alpha_A$ differs from the critical angles $\theta_{CTEO}$ and $\theta_{CTMO}$ by 3.6° and 3.6°, respectively.

As mentioned above, in accordance with the magneto-optical signal detection device wherein the mode splitter of the present invention is applied to the TE-TM mode separating portion, it becomes possible to widen the allowable range of the incident angle in comparison to the device wherein only one taper boundary is arranged to separating modes, as the prior embodiment. Therefore, it becomes possible to attenuate the problems of assembling errors in the fabricating process of the waveguide and misalignment of the waveguide with the other optical elements included in the waveguide.

Besides, the difference between the incident angle with respect to the second taper and the critical angle becomes large, which makes it possible to obtain a signal of high S/N ratio.

Figure 12:
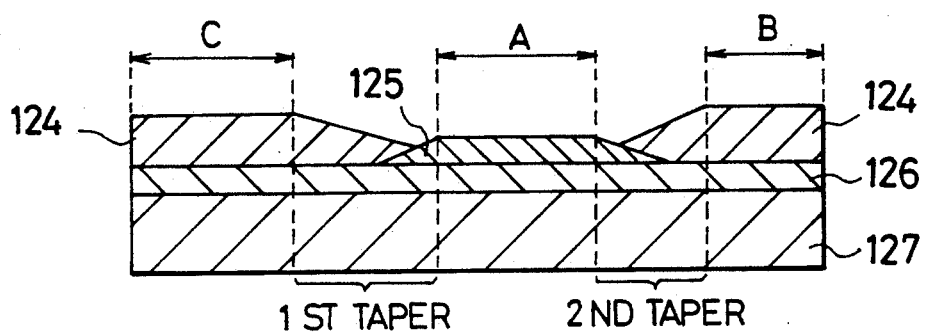
FIG. 12 is a sectional view of further embodiment of the optical waveguide to which the present invention is applied.

It is to be noted that the sectional structure of the waveguide of the present invention may be any of the layered structures of FIGS. 10a, 11a and 12. That is, in FIG. 10a, the high refractive index layer (SiN waveguide layer 125) is buried under the low refractive index layer (SiON waveguide layer 124). In FIG. 11a, the high refractive index layer (SiN waveguide layer 125) is disposed on the low refractive index layer (SiON waveguide layer 124). Or in FIG. 12, the low refractive index layer (SiON waveguide layer 124) is terminated on the taper boundary conjunction.

Also, in the structure of FIG. 12, the materials of the waveguide regions B and C are not necessarily the same.

Also, the layered structure is not limited to the structure of FIG. 12 wherein the $SiO_2$ buffer layer 126 is stacked on the substrate 127 and further the SiON layer 124 or the SiN layer 125 is stacked on the layer 126.

As mentioned above, in accordance with the mode splitter of the present invention, plural modes are separated first due to the refraction angle difference between the modes when being refracted at the first taper boundary and after that, the modes are separated further due to the critical angle difference between the modes at the second taper boundary. In accordance with such an arrangement of the present invention, the allowable range of the incident angle becomes large in comparison to the structure where only one taper boundary is arranged to separate the modes, which attenuates the problems of assembling errors in the fabricating process of the waveguide and misalignment of the waveguide with the other optical elements included in the waveguide.

Besides, the difference between the incident angle with respect to the second taper and the critical angle becomes large, which makes it possible to obtain a signal of high S/N ratio.

Accordingly, in accordance with the magneto-optical signal detection device having a TE-TM mode separating portion to which the mode splitter of the invention is applied, it becomes possible to easily and reliably position the coupling members and photodetectors and obtain a magneto-optical signal of high S/N ratio without being adversely influenced from the reflection light noise from the recording medium and the luminous intensity distribution of the reflection light.

The magneto-optical pick up relating to the present invention is further described below.

Figure 13:
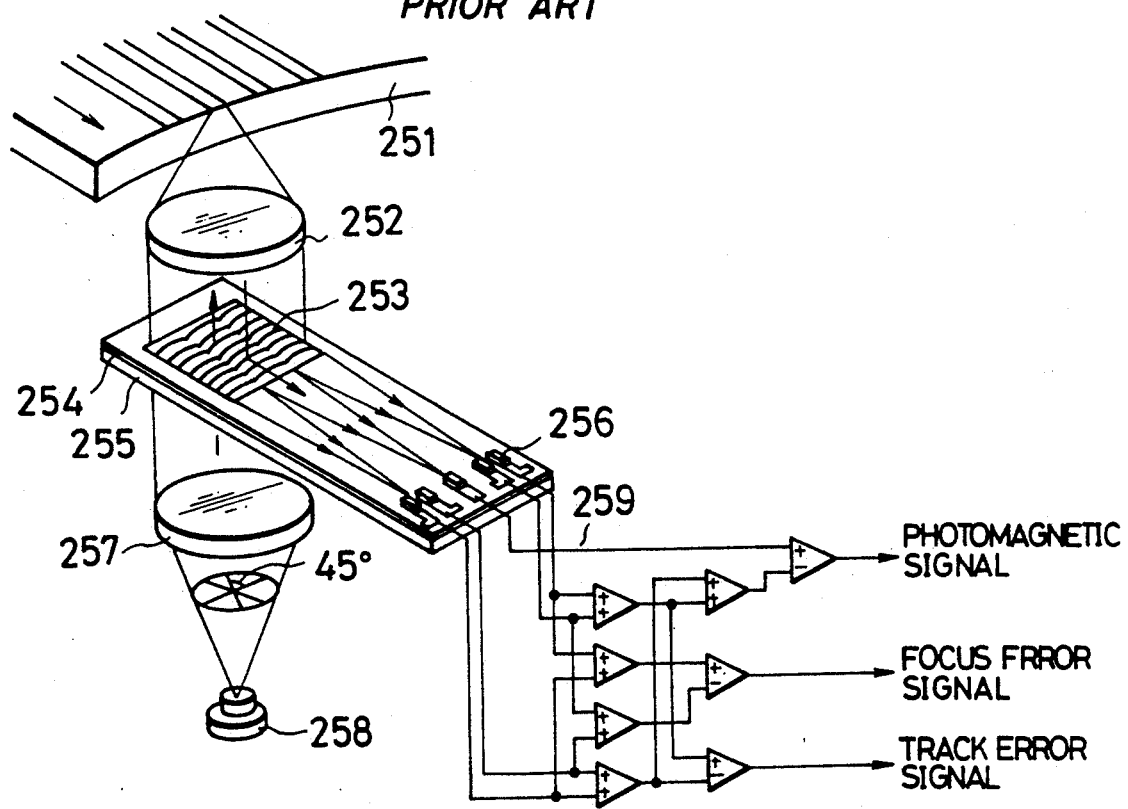
FIG. 13 is an explanatory view of a magneto-optical information read/write device in accordance with the related art.

FIG. 13 illustrates a whole structure of the magneto-optical disk pick up device.

Figure 14A:
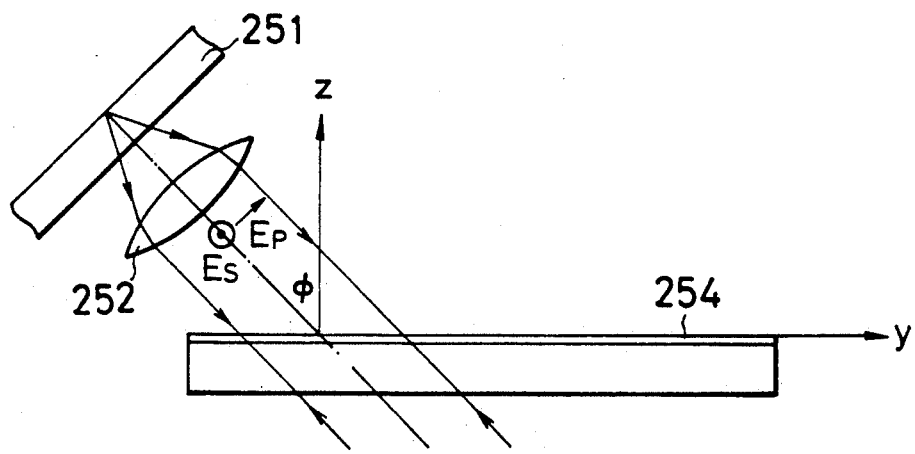
FIG. 14a is an explanatory side view of the device of FIG. 13.
Figure 14B:
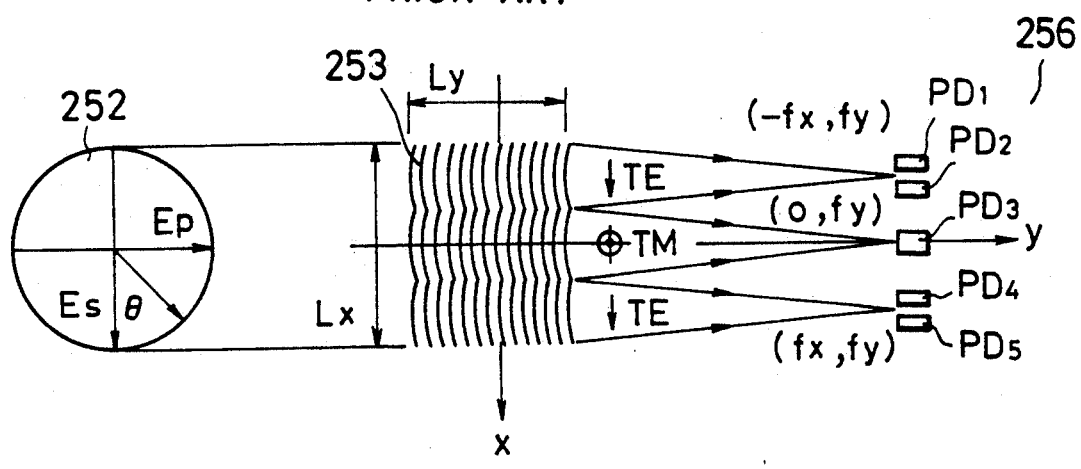
FIG. 14b is an explanatory plan view of the device of FIG. 13.

Also, FIGS. 14a and 14b are explanatory views for explaining the principle of the differential detection of the magneto-optical signal wherein FIG. 14a illustrates a side view of the device and FIG. 14b illustrates a plan view of the device, respectively.

The device structure is constituted from a magneto-optical disk 251, an objective lens 252, a trifocal focusing grating coupler (TFGC) 253, an optical waveguide 254, a substrate 255, photodiodes 256, a collimator lens 257, a semiconductor laser source 258 and a magneto-optical signal differential detecting portion 259.

By the structure of FIG. 13, it is possible to detect a magneto-optical signal (MO signal), a focus error signal (FO signal) and a track error signal (TR signal).

The reflection light reflected from the record medium 251 can be represented by a compound vector composed of a P component (Ep) and an S component (Es) of the electric field. Also, a TE mode and a TM mode perpendicular to each other in the waveguide 254 have slightly different effective refractive indices, respectively. Therefore, taking this into consideration, the device is arranged so that the Ep component of the reflection light satisfies the phase matching condition at the central focusing grating coupler (FGC) so as to couple the TM mode while that the Es component satisfies the phase matching condition at the both two end portions of the FGC so as to couple the TE mode.

As mentioned above, the FGC is divided to three portions to constitute two optical analyzers to detect two perpendicularly polarized light functioning as a differential detector device to obtain a magneto-optical signal.

The magneto-optical signal is represented by MO signal = (PD1) + (PD2) + (PD4) + (PD5) − (PD3).

The focus error signal is detected with the use of the two end portions of the FGC in a manner similar to the Foucault method.

When the disk 251 is moved away from the lens 252, the reflection light from the disk becomes convergent so that the converging point in the FGC moves toward the front side of the photodiode (PD) 256, whereby the optical amount received by the two inside detectors PD 2 and PD 4 is increased.

On the other hand, when the disk 251 is moved toward the lens 252, the reflection light from the disk becomes divergent so that the optical amount received by the two outside detectors PD 1 and PD 5 is increased.

Accordingly, it becomes possible to obtain the focus error signal from the difference of the outputs between the inside and outside photodiodes. The focus error signal is represented by FO signal = {(PD2)+(PD4)} − {(PD1)+(PD5)}.

Also, the tracking signal is detected by a push-pull method with the use of the two end portions of FGC. When the scanning beam is dislocated from the track, the luminous intensity distribution of the reflection light becomes asymmetric along the direction X so that the optical amount received by the two outer end detectors becomes uneven. The tracking signal is represented by TR signal = {(PD1)+(PD2)} − {(PD4)+(PD5)}.

As mentioned above, to detect the magneto-optical signal, the surface of the coupler is divided for differential detection of the signal in such a way that the TM mode is coupled in the central portion of the FGC while the TE mode is coupled in the two end portions of the FGC. However, in accordance with such an arrangement, the noise of the reflection light from the disk remains and the luminous intensity distribution is still being asymmetric even by the differential detection of the signals. This is because the luminous intensity distributions of the three portions of the FGC are not even.

Therefore, when a magneto-optical signal is to be detected, to raise the S/N ratio, it is desirable to arrange the detection device in such a manner that both of the TE mode and the TM mode are simultaneously coupled first in the whole coupling surface of the waveguide and after that, the two modes are separated in the waveguide.

Also, in accordance with the aforementioned differential detection method for detecting the magneto-optical signal, both of the TE mode and the TM mode are coupled by the FGC, which results in that the diffraction efficiency is lowered and the focal point is dislocated when the wavelength is changed, which impares the detection reliability of the signal and the focal point and lowers the S/N ratio of the signal.

The embodiments of the magneto-optical information read/write device in accordance with the invention were made considering the above mentioned points of the related art and enable to obtain a photomagnetic signal, a focal point detection signal and a tracking signal which have high S/N ratio.

Figure 15:
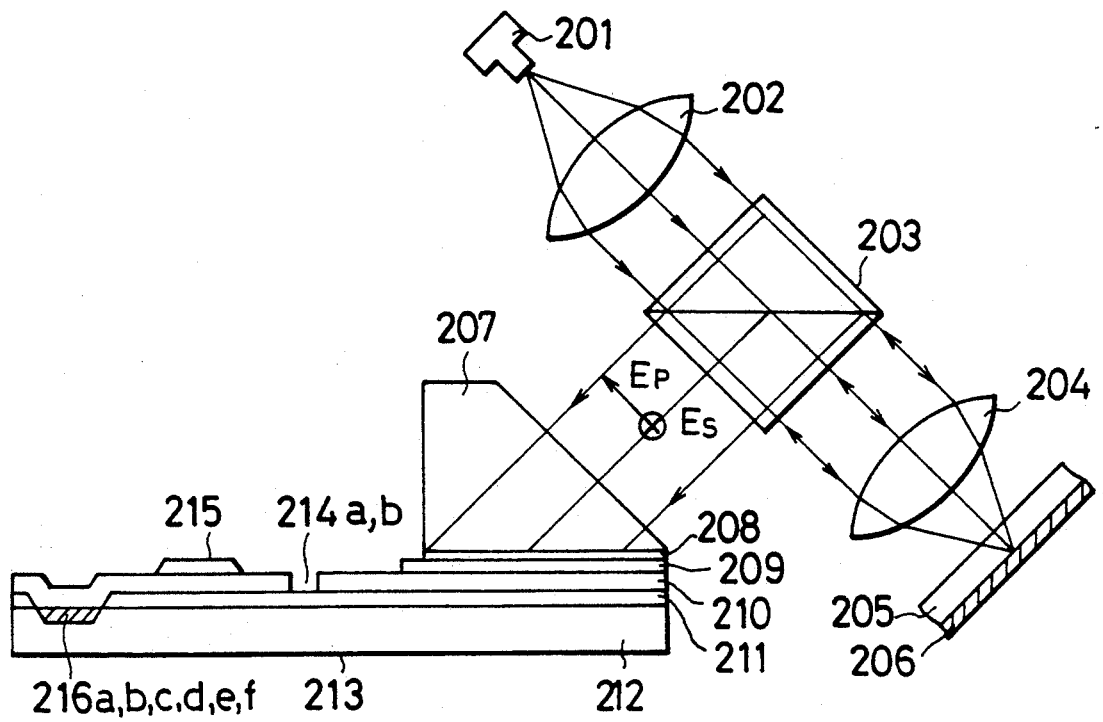
FIG. 15 is a constructional view of a magneto-optical information read/write device in accordance with an embodiment of the present invention.

FIG. 15 illustrates a side view of an embodiment of the magneto-optical information read/write device in accordance with the present invention.

Figure 16:
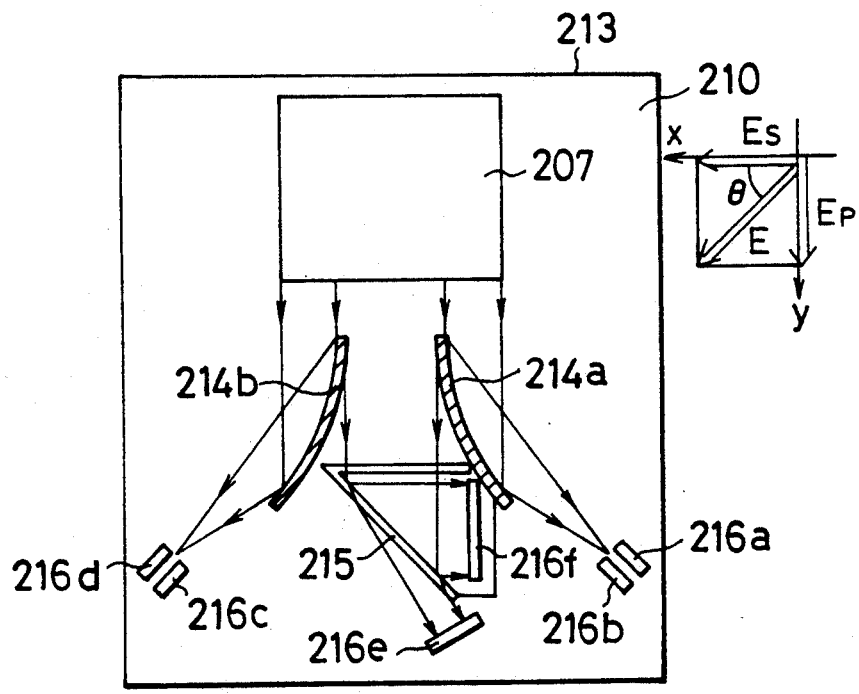
FIG. 16 is a partial plan view of the device of FIG. 15.

And FIG. 16 illustrates a plan view of the waveguide element of the device of FIG. 15.

The read/write device of this embodiment comprises a light source 201, a collimator lens 202, a half mirror 203, an objective lens 204, a substrate 205, a magneto-optical recording medium 206, a prism coupler 207, a high refractive index adhesive layer 208, a gap layer 209, an optical waveguide layer 210, a buffer layer 211, a substrate 212, a waveguide light convergent element (waveguide unit) 213, waveguide concave mirrors 214a and 214b, a high refractive index waveguide layer 215, and photodetectors 216a to 216f. The light beam emitted from the source 201 is collimated by the lens 202 and passes through the half mirror 203 (or polarization beam splitter) to converge on the surface of the medium 206 on the substrate 205 through the lens 204. The beam is reflected on the medium surface.

The polarization plane of the reflection light is rotated by $\pm \Delta\theta$ depending on the direction of the magnetization of the medium 206 corresponding to the information data recorded therein.

The reflection light is converged by the lens 204 and reflected by the half mirror 203 toward the prism coupler 207 mounted on the unit 213. The polarization direction of the reflection light, that is, the electric field vector, is decomposed to an Ep component parallel to the sheet of FIG. 15 and an Es component perpendiculer to the sheet. The Es component energizes the TE mode in the waveguide layer 210 while the Ep component energizes the TM mode.

The TE mode and the TM mode introduced into the waveguide layer 210 through the prism coupler 207 are divided to three parts by the concave mirrors 214a and 214b. The outer two beams are reflected and converged by the mirrors 214a and 214b toward the detector pairs 216a, 216b and 216c, 216d, respectively. Each beam converges to a point between the detectrors (216a, 216b), (216c, 216d).

On the other hand, the central beam is transmitted to the waveguide layer 215 which has taperd peripheral boundary where the thickness thereof is gradually thinned toward outside. The TE mode of the central beam is totally reflected at the taper boundary of the layer 215 and the forward direction thereof is changed. On the other hand, the TM mode of the central beam is refracted and penetrates through the taper boundary. The forward direction of the TM mode is also changed. The TM mode light is received by the detector 216e and the TE mode light is received by the detector 216f, respectively.

The light source 201 is desirably lineally polarized and has a high degree of coherence. The source may comprise a semiconductor laser device, a solid laser device, a gas laser device or a second higher harmonics of the lasers.

The lenses 202 and 204 may be constructed from a normal lens, an assembly of the normal lenses, an aspherical lens, a distributed index lens, a Fresnel lens, or the combination of these lenses.

A polarization beam splitter may be used instead of the harf mirror 203.

The substrate 212 of the waveguide unit 213 comprises a semiconductor plate such as Si or GaAs in this particular embodiment. With the use of such a substrate, it becomes possible to monolithicly fabricate photodetectors, transistors and other electronic parts on the substrate.

Next, with regard to the layers 209, 210 and 211, it is necessary to use material which is transparent with respect to the wavelength of the light to be used such as dielectric material, glass, or an organic thin film. Also, it is necessary that the refractive indices $n_G$ and $n_B$ of the layers 209 and 211 are smaller than the refractive index $n_T$ of the layer 210, respectively. The substrate 212 may be constituted from dielectric material, glass, or plastic instead of semiconductor material. The buffer layer 211 may be deleted if the substrate 212 is transparent for the light from the source or the waveguide loss of the mode in the layer 210 can be neglected.

Next, with regard to the adhesive layer 208 and the prism coupler 207, it is necessary to satisfy the condition $$n_P \gtreqless n_H > n_T$$

wherein $n_P$, $n_H$, and $n_T$ represent the refractive indices of the prism coupler 207, the adhesive layer 208, and the waveguide layer 210, respectively. The coupler 207 may be formed from glass, dielectric crystal, or plastic and secured to the gap layer 209 through the adhesive layer 208. The layer 208 may be composed of an organic or inorganic group adhesive agent or a resin agent.

Next, with regard to the concave mirrors 214a and 214b, each of the mirrors is formed by partly removing the layer 210 to constitute a total reflection mirror. The layer 210 is partly removed in such a way that the layer is patterned by photolithographical technique and after that, the layer is etched by a dry or wet etching process. Or otherwise, the layer may be partly removed by an ion milling process or cutting mechanically. Instead further, the mirrors 214a and 214b can be formed by attaching metal such as Ag, Au or Al after partly removing the layer 210 or disposing a multi-layered dielectric film.

Next, with regard to the high refractive index waveguide layer 215, this layer 215 has both two ends each formed as a gentle taper which is gradually thinned desirably linealy toward the tip. The power center of each of the TE mode and the TM mode is transferred to the layer 215 from the layer 210 through which the light including the two modes has been guided. For this purpose, the layer 215 has a higher refractive index than the layer 210 has. The layer 215 has to be transparent with respect to the wavelength of the light being used as well as the layer 210 and other layers. Each layer may be formed by an evaporation process, a sputtering process, a CVD process, a coating process, an oxidation process, an ion exchanging process or an ion implanting process. Also, the taper boundary portion may be formed by an etching process, a shadow mask process, an ion milling process, an anisotropic etching process or a mechanical cutting process.

Each of the photodetectors 216a to 216f may be composed of a PIN photodiode formed by diffusing impurities or a Schottoky barrier type diode. Or when the substrate 212 is not made from semiconductor material, an $\alpha$-Si photodiode can be used as the detector 216. In this case, each photodiode is mounted on the layer 210 or 215. The layer 215 may be formed between the layers 210 and 211 instead of being formed on the layer 210 as is the case of FIG. 15. The same function and effect can be obtained as the structure of FIG. 15.

The layers 208 and 209 are arranged for the purpose of reliably fixing the coupler 207 and obtaining a stable and high coupling efficiency in response to the incident beam diameter. However, if the coupler 207 can be mechanically secured to the unit 213 in such a manner that the gap between the coupler 207 and the unit 213 is adjustable, the layers 208 and 209 may be deleted.

Also, each of the two pairs of the photodetectors 216a to 216d may be disposed in such a manner that one detector is disposed interfering a part of the beam and the other detector is disposed covering the other part of the beam, instead of the parallel arrangement as illustrated in FIG. 16.

A method for detecting various signals in accordance with the present invention is described hereinafter.

First, the function for detecting the magneto-optical signal is described.

The polarization plane of the reflection light from the record medium 206 is rotated by $\pm \Delta \theta$ from the state of incident beam prior to the reflection on the medium surface in response to the direction of the magnetization vector.

The reflection light incident to the prism coupler 207 is introduced and coupled to the waveguide layer 210 through the coupler 207. As mentioned before, the electric field vector of the reflection light can be decomposed to the Es component and the Ep component. The Es component energizes the TE mode of the coupled light in the waveguide while the Ep component energizes the TM mode.

In FIG. 16, the electric field vector E of the reflection light is represented in such a way that the direction of Es in FIG. 15 (perpendicular to the drawing sheet of FIG. 15) is aligned with the direction X and the direction Ep is aligned with the direction Y. The X-Y plane is perpendicular to the optical axis of the reflection light. The reference $\theta$ represents the angle between the vector E and the axis X.

Suppose that reference $\theta_o$ represents the angle between the axis X and the vector E before being rotated by the recording medium 206. The angles of the actual vector E of the reflection light satisfies the equation $$\theta = \theta_o \pm \Delta\theta$$

in response to the direction of the magnetization vector.

Next, with regard to the TE mode and the TM mode propagating through the layer 210, the optical power of each mode is transferred from the layer 210 to the layer 215 at the taper boundary of the layer 215. Also, the difference of the equivalent refractive index between the modes TE and TM is slightly changed. The layer 215 has a second taper boundary portion to which the light is guided with an incident angle arranged so that the TE mode light is reflected while the TM mode light is refracted and penetrates through the boundary. The TE mode is reflected on the inclined taper boundary and guided through the layer 215 to the photodetector 216f. On the other hand, the TM mode is emitted out of the layer 215 through the taper boundary thereof and received by the photodetector 216e.

The angle $\theta_o$ is arranged so that when the direction of the vector E is in the state of $\theta = \theta_o$, the outputs E and F of the detectors 216e and 216f become as E=F. Also, the sensitivity of each detector is adjusted to obtain the above-mentioned state of the detector. Due to such an arrangement, when the polarization plane of the reflection light is rotated resulting in $\theta = \theta_o + \Delta\theta$, the Ep component is increased while the Es component is decreased. Accordingly, the TM mode light is increased while the TE mode light is decreased. When the magneto-optical record signal is represented by S=E−F, the state becomes E>F and S>0.

On the other hand, when the state becomes as $\theta = \theta_o - \Delta\theta$, the Ep component is decreased while the Es component is increased resulting in that the TM mode light is decreased while the TE mode light is increased. Accordingly, the state becomes as E<F and S<0.

In accordance with the manner mentioned above, it becomes possible to detect the rotational direction of the polarization plane of the reflection light in response to the polarity of the signal S, which makes it possible to obtain the magneto-optical record signal.

Next, with regard to the angle $\theta$ between the axis X and the vector E of the backward reflection light from the medium 206 through the half mirror 203 (or a beam splitter), a method for initially setting for $\theta = \theta_o$ is described below. In this case, it is necessary to arrange the detectors 216e and 216f of FIG. 16 so that the outputs E and F thereof are equal to each other. Such an arrangement can be achieved in such a way that the polarization plane of the light source 201 is rotated about its optical axis and the unit 213 is rotated about the optical axis of the reflection light with respect to the other optical systems. The arrangement can also be achieved by inserting a halfwave plate between the light source 201 and the lens 202, or between the lens 202 and the half mirror 203, or between the half mirror 203 and the prism coupler 207, in such a manner that the plate is perpendicular to the optical axis so that the linear polarization plane is rotated by the angle twice as that between the polarization plane of the light incident to the halfwave plate and the phase axis of the halfwave plate. Accordingly, it becomes possible to obtain a desired angle $\theta_o$ of the polarization plane by rotating the halfwave plate.

The above-mentioned method is especially advantageous since it becomes possible to rotate the polarization plane without moving the other optical systems.

Besides, when the beam splitter is used instead of the half mirror, in general, the rotation angle $\theta_o$ of the polarization plane of the reflection light is limited since the vector E of the light reflected by the beam splitter has the Es component which is increased and the Ep component which is decreased. However, this problem can be obviated by the above-mentioned arrangement wherein the halfwave plate is disposed between the beam splitter and the coupler 207 so that any desired polarization direction can be selected.

Next, a method for detecting the focus error signal is described below.

In FIG. 16, the light beam guided to and coupled with the waveguide layer 210 of the unit 213 through the prism 207 is divided to three portions by the concave mirrors 214a and 214b, that is, a central portion and two end portions along the both sides of the central portion. The positions of mirrors 214a and 214b, the prism 207, detectors 216a to 216d and the sensitivity of each detector are adjusted so that when the lens 204 is focussed on the record medium surface (in-focus), each of the outside divisional beams is converged on a point in front of each detector pair 216a, 216b, and 216c, 216d, as illustrated in FIG. 16.

In this state, the outputs A, B, C, D of the detectors 216a to 216d are represented as A=B and C=D. Also, when the focus error signal $\Delta F$ is represented by $\Delta F = (A+D) - (B+C)$, it becomes $\Delta F = 0$ when the lens is in-focus state.

Figure 17:
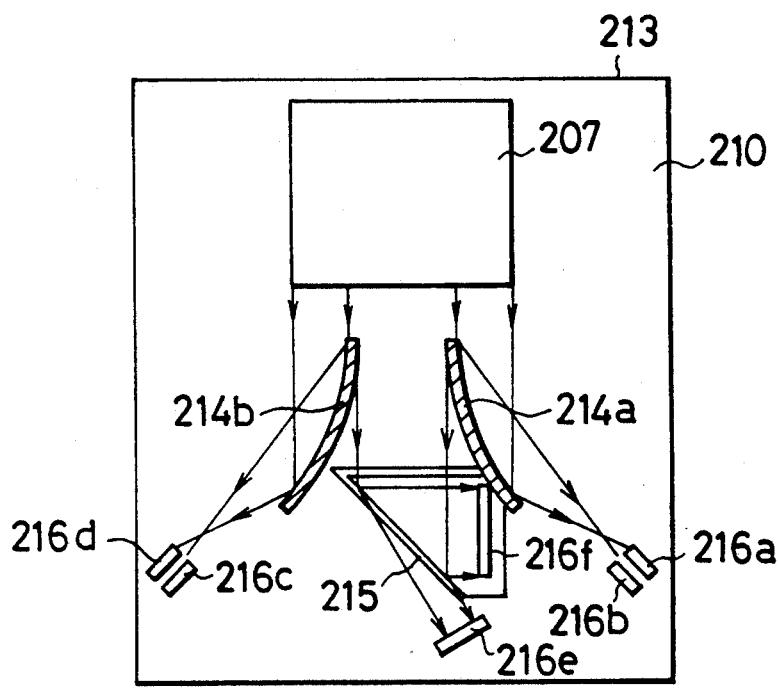
FIG. 17 is an explanatory view for explaining the optical path of the beam with respect to the photodetector.

In the event where the recording medium 206 is moved away from the focal point of the lens 204, the backward reflection beam becomes slightly convergent when compared with the in-focus state. Therefore, as illustrated in FIG. 17, the convergent point of each of the outside two beams reflected and converged by the mirrors 214a and 214b is shifted away from the detectors frontward. Therefore, the state becomes as A>B and C<D, and also $\Delta F > 0$.

Figure 18:
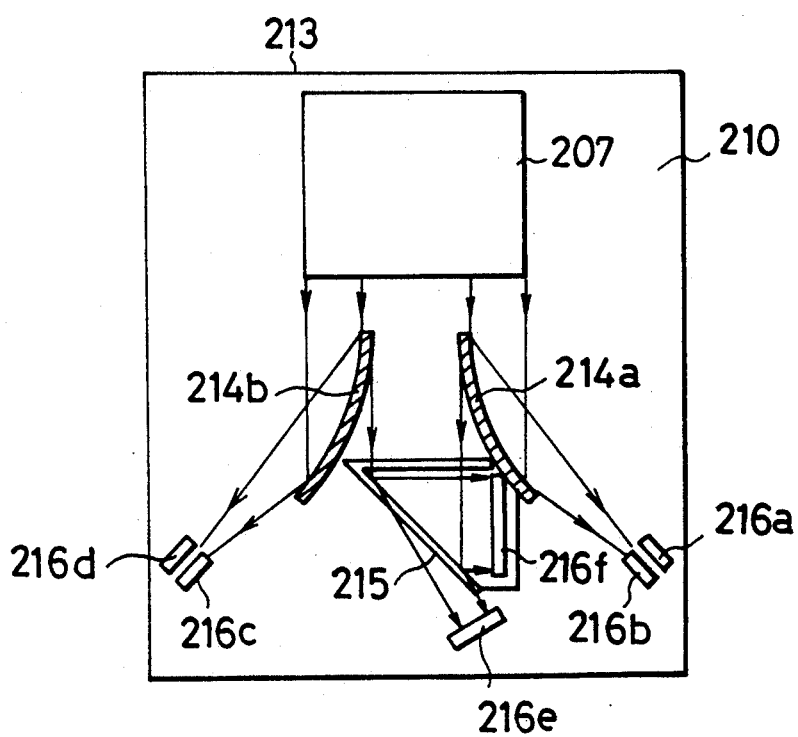
FIG. 18 is another explanatory view for explaining the optical path of the beam with respect to the photodetector along with FIG. 17.

On the other hand, in the event where the recording medium 206 is moved toward the lens 204 from the focal point thereof, the backward reflection beam becomes slightly divergent when compared with the state of in-focus. Therefore, in the waveguide unit 213, the convergent point of each of the two outside beams reflected by the mirrors 214a and 214b is shifted inward of the detectors, as illustrated in FIG. 18. Therefore, the state becomes as A<B and C>D, and also $\Delta F < 0$.

Accordingly, it becomes possible to carry out autofocussing by moving the lens 204 or the whole optical system by an actuator so that the state becomes as $\Delta F = 0$.

Next, with regard to the track error signal $\Delta T$, the signal is arranged as $$\Delta T = (A + B) - (C + D)$$

by a push-pull method. With this arrangement, it becomes possible to carry out auto-tracking by moving lens 204 or the whole optical system by an actuator in response to the polarity of $\Delta T$.

It is to be noted that if the track error signal $\Delta T$ is unnecessary, one of the mirrors 214a and 214b and the pair of detectors 216a, 216b and 216c, 216d used in cooperation with the mirror may be deleted. In this case, the focus error signal can be detected from $\Delta F = A - B$ or $\Delta F = C - D$.

Figure 19:
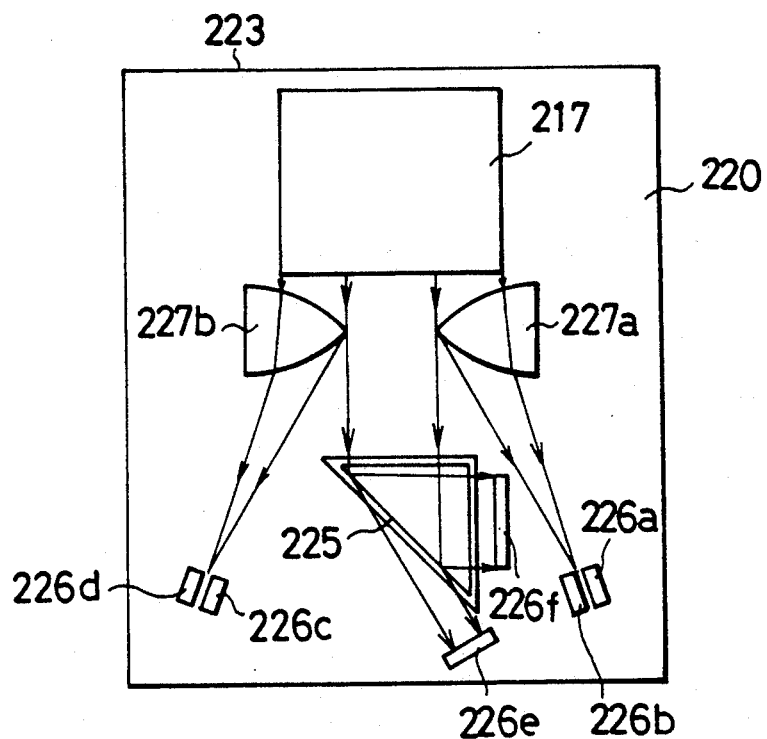
FIG. 19 is a plan view of an embodiment in accordance with the present invention.

FIG. 19 illustrates a still futher embodiment of the magneto-optical signal detection device in accordance with the present invention.

The embodiment comprises a prism coupler 217, an optical waveguide layer 220, a waveguide unit 223, a pair of waveguide lens beam splitters 227a and 227b, a high refractive index waveguide layer 225 and photodetectors 226a to 226f. In this embodiment, the beam splitters 227a and 227b are used instead of the concave mirrors 214a and 214b of FIG. 16. The entire periphery of the layer 225 is formed as a taper boundary. The magneto-optical signal is detected by the same way as in the case of FIG. 16 embodiment. The focus error signal $\Delta F$ can be detected from $$\Delta F = (B + C) - (A + D)$$

according to the same way as the embodiment of FIG. 16. Also, the track error signal can be detected by the same way as the embodiment of FIG. 16.

Figure 20:
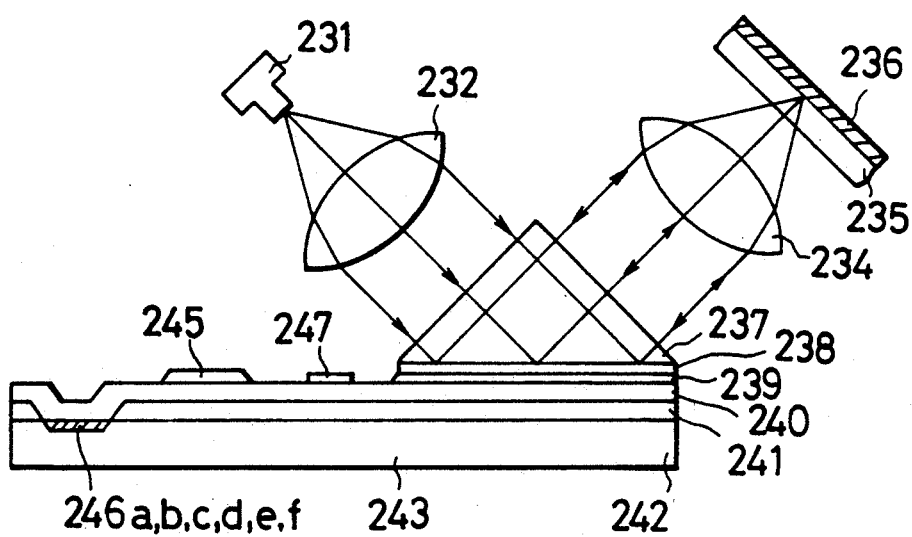
FIG. 20 is a sectional view of another embodiment in accordance with the present invention.
Figure 21A:
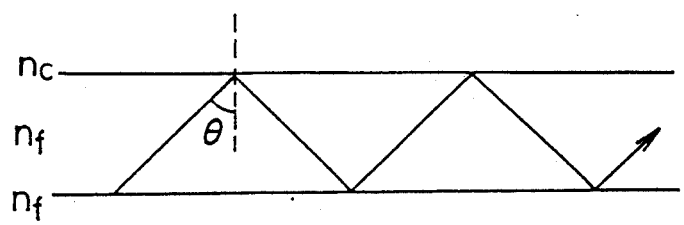
FIGS. 21a and 21b are drawings for explaining the propagation constant and a guided mode of light.
Figure 21B:
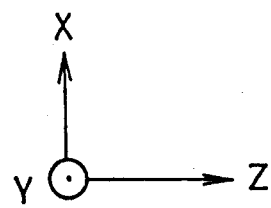

FIG. 20 illustrates a still further embodiment of the present invention. The plan view of this embodiment is the same as that of FIG. 19.

The embodiment of FIG. 20 comprises a light source 231, a collimator lens 232, an objective lens 234, a substrate 235, a magneto-optical recording medium 236, a prism coupler 237, a high refractive index adhesive layer 238, a gap layer 239, an optical waveguide layer 240, a buffer layer 241, a substrate 242, a waveguide unit 243, a high refractive index waveguide layer 245, photodetectors 246a to 246f, and a pair of waveguide lens beam splitters 247a and 247b.

In accordance with the embodiment of FIG. 20, instead of using the half mirror 203 of FIG. 15, the arrangement is made in such a way that the light from the lens 232 is guided first to the prism 207 on the unit 243, after that the reflection light from the bottom plane of the prism passes through the lens 234 and converges on the medium 236, and that the reflection light back from the medium surface passes through the lens 234 to the prism 237 again so that the reflection light is coupled with the layer 240 of the unit 243.

The TE mode and the TM mode coupled with the layer 240 through the prism 237 are divided to three parts by the beam splitters 247a and 247b. The outside two parts of the beam are converged by the beam splitters 247a and 247b, respectively. The convergent point of each outside part of the beam is the center of each pair of detectors 226a, 226b, 226c, 226d.

On the other hand, the central part of the beam enters the layer 245 having the taper boundary all around the layer. At the inclined taper boundary of the layer 245, the TE mode light is totally reflected so that the forward direction of the light is changed while the TM mode light is refracted and penetrates through the boundary, the forward direction of the TM mode being also changed. The TM mode and the TE mode are received by the detectors 226e and 226f, respectively.

The structure of FIGS. 16, 17 and 18 can also be applied to the embodiment of FIG. 20. Also, the signals can be detected by the same way as the embodiments of FIGS. 16 and 19.

As can be seen from the description, the following advantages can be obtained from the embodiments of the invention mentioned above.

First, a prism coupler is used for guiding and energizing the backward reflection light into the waveguide without using a diffraction means, which makes it possible to keep the coupling efficiency and the focal point stable irrespective of wavelength change of the light being used. Therefore, the S/N ratio is raised without lowering the reliability and efficiency of signal detection due to the change of the wavelength.

Second, the photomagnetic signal is detected in such a way that the reflection light is coupled with the waveguide through the prism, and that the TE mode and the TM mode of the light are simultaneously separated in the center of the waveguide, and after that the signal is detected on the basis of the difference between the two modes. Therefore, it becomes unnecessary to divide the surface of the FGC to energize the TE mode and the TM mode in the respective divided FGC portions as the prior art, which makes it possible to minimize the adverse influence against the signal detection from the noise of reflection light or uneven distribution of the luminous intensity of the reflection light, thus raising the S/N ratio of the detected signals.

Many widely different embodiments of the present invention may be constructed without departing from the spirit and scope of the present invention. It should be understood that the present invention is not limited to the specific embodiments described in the specification, except as defined in the appended claimes.

What is claimed is:

1. A magneto-optical signal detection device, comprising:
   a first waveguide layer;
   a light coupling means disposed on one end portion of said first waveguide layer for simultaneously coupling two polarization components of light reflected from a magneto-optical recording medium, which are perpendicular to each other, into said first waveguide layer to thereby produce a first light of TE mode and a second light of TM mode, each of which propagates toward the opposite end portion of said first waveguide layer; and
   a light separating means comprising a second waveguide layer which is disposed on said opposite end portion of said first waveguide layer so as to efficiently separate said first light and said second light propagated through said first waveguide layer,
   said second waveguide layer having a first edge portion for receiving said first and second lights propagating within said first waveguide layer, and a second edge portion from which one of said received first and second lights is emitted, and from which the other of said received first and second lights is reflected, said first and second edge portions crossing each other at a predetermined angle at one end of each of said first and second edge portions, the thickness of each of said first and second edge portions becoming gradually smaller toward the outside of said second waveguide layer,
   said first waveguide layer and said second waveguide layer satisfying the following formulae:

$$\beta_{Ai} > \beta_{Bi} \tag{1}$$

$$\beta_{Aj} > \beta_{Bj} \tag{2}$$

$$(\beta_{Bi}/\beta_{Ai}) > (\beta_{Bj}/\beta_{Aj}) \tag{3}$$

$$\theta > \sin^{-1}((\beta_{Bi}/\beta_{Ai}) \tag{4}$$

$$\sin^{-1}\{(\beta_{Ai}/\beta_{Bj}) \sin (\theta - \theta_{ci})\} < \alpha < \sin^{-1}\{(\beta_{Aj}/\beta_{Bj}) \sin (\theta - \theta_{cj})\} \tag{5}$$

where $\beta_{Ai}$ is a propagation constant of one of said first and second lights in said first waveguide layer, $\beta_{Bi}$ is a propagation constant of said one of said first and second lights in said second waveguide layer, $\beta_{Aj}$ is a propagation constant of the other of said first and second lights in said first waveguide layer. $\beta_{Bj}$ is a propagation constant of said other of said first and second lights in said second waveguide layer, $\theta$ is said predetermined angle, and $\alpha$ is an incident angle of a light including said TE mode and said TM mode with respect to said first edge portion, wherein $\theta_{ci}$ is equal to $\sin^{-1} (\beta_{Bi}/\beta_{Ai})$ and represents a critical angle of said one of said first and second lights, $\theta_{cj}$ being equal to $\sin^{-1} (\beta_{Bj}/\beta_{Aj})$ and representing a critical angle of said other of said first and second lights.

2. A magno-optical signal detection device according to claim 1, wherein said light coupling means comprises a prism coupler.

3. A magno-optical signal detection device according to claim 1, wherein said light coupling means comprises a grating element.

4. A magno-optical signal detection device according to claim 1, wherein said light coupling means and said light separating means are formed monolithicly on said first waveguide layer.

5. A magno-optical signal detection device according to claim 4, wherein said first waveguide layer comprises a layer of SiON formed on a buffer layer of $SiO_2$ which is disposed on a substrate of Si, and said light separating means comprises a waveguide layer of SiN formed on said buffer layer.

6. A magneto-optical signal detection device according to claim 5, wherein said waveguide layer of SiN has an edge portion gradually thined toward an outside of said waveguide layer.

7. A magneto-optical signal detection device according to claim 1, wherein said device further comprises means for dividing a light including said TE mode and said TM mode, coupled into said first waveguide layer through said light coupling means, into a first part to be guided to said light separating means and a second part to be guided to a position other than said light separating means.

8. A magneto-optical signal detection device according to claim 7, wherein said dividing means divides said light into a first light flux propagating through a central part of said first waveguide layer and second and third light fluxes propagating through both sides of said central part.

9. A magneto-optical signal detection device according to claim 8, wherein a photodetector means is arranged for each of said first to third light fluxes.

10. A magneto-optical signal detection device according to claim 9, wherein said photodetector means is arranged so that a magno-optical signal is detected from said first light flux, and that a focus error signal and a track error signal are detected from said second and third light fluxes.

11. A light splitter for efficiently separating a first light of TE mode and a second light of TM mode propagating through a waveguide, comprising a waveguide layer disposed on said waveguide and having a first edge portion for receiving said first and second light and a second edge portion from which one of said first and second lights is emitted and the other of said first and second lights is reflected, said first and second edge portions crossing each other at a predetermined angle at one end of each of said first and second edge portions, the thickness of each of said first and second edge portions becoming gradually smaller toward an outside of said waveguide layer, said waveguide and said waveguide layer satisfying the following formulae:

$$\beta_{Ai} > \beta_{Bi} \quad (1)$$

$$\beta_{Aj} > \beta_{Bj} \quad (2)$$

$$(\beta_{Bi}/\beta_{Ai}) > (\beta_{Bj}/\beta_{Aj}) \quad (3)$$

$$\theta > \sin^{-1}(\beta_{Bi}/\beta_{Ai}) \quad (4)$$

$$\sin^{-1}\{(\beta_{Ai}/\beta_{Bi}) \sin (\theta - \theta_{ci})\} < \alpha < \sin^{-1}\{(\beta_{Aj}/\beta_{Bj}) \sin (\theta - \theta_{cj})\} \quad (5)$$

where $\beta_{Ai}$ is a propagation constant of one of said first and second lights in said first waveguide, $\beta_{Bi}$ is a propagation constant of said one of said first and second lights in said waveguide layer, $\beta_{Aj}$ is a propagation constant of the other of said first and second lights in said waveguide, $\beta_{Bj}$ is a propagation constant of said other of said first and second lights in said waveguide layer, $\theta$ is said predetermined angle, and $\alpha$ is an incident angle of a light including said TE mode and said TM mode with respect to said first edge portion, wherein $\theta_{ci}$ is equal to $\sin^{-1}(\beta_{Bi}/\beta_{Ai})$ and represents a critical angle of said one of said first and second lights, $\theta_{cj}$ being equal to $\sin^{-1}(\beta_{Bj}/\beta_{Aj})$ and representing a critical angle of said other of said first and second lights.

* * * * *